(12) United States Patent
Ujihara et al.

(10) Patent No.: US 10,651,474 B2
(45) Date of Patent: May 12, 2020

(54) LITHIUM SECONDARY BATTERY

(71) Applicant: PANASONIC CORPORATION, Osaka (JP)

(72) Inventors: Toru Ujihara, Aichi (JP); Kohei Ishikawa, Aichi (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 15/915,982

(22) Filed: Mar. 8, 2018

(65) Prior Publication Data

US 2018/0198131 A1 Jul. 12, 2018

Related U.S. Application Data

(63) Continuation of application No. PCT/JP2017/024698, filed on Jul. 5, 2017.

(30) Foreign Application Priority Data

Jul. 14, 2016 (JP) .................... 2016-139352

(51) Int. Cl.
*H01M 4/66* (2006.01)
*H01M 4/134* (2010.01)
(Continued)

(52) U.S. Cl.
CPC .......... *H01M 4/661* (2013.01); *H01M 4/134* (2013.01); *H01M 4/1395* (2013.01);
(Continued)

(58) Field of Classification Search
CPC ........ H01M 4/661; H01M 4/134; H01M 4/75; H01M 4/382; H01M 10/0569; H01M 10/0525
See application file for complete search history.

(56) References Cited

U.S. PATENT DOCUMENTS 5,882,820 A * 3/1999 Matsui .................... H01M 4/04
264/104
2014/0287259 A1 9/2014 Ishizuka et al.
(Continued)

FOREIGN PATENT DOCUMENTS

JP 10-012218 A 1/1998
JP 2001-243957 A 9/2001
(Continued)

OTHER PUBLICATIONS

Saito, T. et al. "Surface Film Formation and Lithium Underpotential Deposition on Au(111) Surfaces in Propylene Carbonate," Journal of the Electrochemical Society, vol. 150, Issue 4, pp. A532-537, 2003.
(Continued)

*Primary Examiner* — Osei K Amponsah
(74) *Attorney, Agent, or Firm* — McDermott Will & Emery LLP

(57) ABSTRACT

A lithium secondary battery has a positive electrode, an electrolyte containing lithium ions, and a negative electrode current collector having a surface on which a lithium metal or a lithium alloy is deposited/dissolved. In the surface of the negative electrode current collector, a group comprising at least one region whose principal crystal plane is a close-packed plane of the crystal structure or an off plane having an off-angle of 20° or less with respect to the close-packed plane occupies the largest area among three or four groups each comprising at least one region having a principal crystal plane three of whose Miller indices are each represented by 0 or 1 or an off-plane having an off-angle of 20° or less with respect to the principal crystal plane, the principal crystal plane being different for each of the three or four groups.

30 Claims, 31 Drawing Sheets

(51) Int. Cl.
*H01M 4/75* (2006.01)
*H01M 4/38* (2006.01)
*H01M 10/0525* (2010.01)
*H01M 10/0569* (2010.01)
*H01M 10/052* (2010.01)
*H01M 4/1395* (2010.01)
*H01M 4/02* (2006.01)

(52) U.S. Cl.
CPC .......... *H01M 4/382* (2013.01); *H01M 4/663* (2013.01); *H01M 4/75* (2013.01); *H01M 10/052* (2013.01); *H01M 10/0525* (2013.01); *H01M 10/0569* (2013.01); *H01M 2004/021* (2013.01); *H01M 2004/027* (2013.01); *H01M 2220/20* (2013.01); *H01M 2300/0037* (2013.01); *Y02E 60/122* (2013.01); *Y02T 10/7011* (2013.01)

(56) References Cited

U.S. PATENT DOCUMENTS

2016/0036091 A1 2/2016 Ohtomo et al.
2017/0133660 A1 5/2017 Kurihara et al.

FOREIGN PATENT DOCUMENTS

| JP | 2001-250559 A | 9/2001 | |
|---|---|---|---|
| JP | 2011-253680 | * 12/2011 | ............ H01M 4/66 |
| JP | 2013-164971 A | 8/2013 | |
| JP | 2013-241663 A | 12/2013 | |
| JP | 2014-220170 A | 11/2014 | |
| JP | 2016-035867 A | 3/2016 | |
| WO | 00/60689 A1 | 10/2000 | |
| WO | 2013/157600 A1 | 10/2013 | |
| WO | 2015/145288 A1 | 10/2015 | |

OTHER PUBLICATIONS

Nendecker, B. J., et al. ""Lithium-Free" Thin-Film Battery with In Situ Plated Li Anode," Journal of The Electrochemical Society, vol. 147, Issue 2, pp. 517-523, 2000.

International Search Report and Written Opinion of International Searching Agency dated Sep. 12, 2017, issued in International Patent Application No. PCT/JP2017/024698; with partial English translation.

* cited by examiner

Amount of charge 0.1 mAh/cm² (short-time charging)

Mapping of crystal planes of negative electrode current collector

Amount of charge 0.1 mAh/cm² (short-time charging)

SEM image of metal lithium deposited on negative electrode current collector

| Value measured on each area | |
|---|---|
| Label name | Maximum diameter (nm)* |
| 1 | 203 |
| 2 | 229 |
| 3 | 223 |
| 4 | 226 |
| 5 | 178 |
| 6 | 219 |
| 7 | 237 |
| 8 | 239 |
| 9 | 199 |
| 10 | 221 |
| ⋮ | ⋮ |
| 30 | 232 |
| Maximum value | 262 |
| Minimum value | 127 |
| Average value | 210 |
| Standard deviation | 0.031 |

*Referring to the longest straight line among straight lines connecting any two points on the outer perimeter of a selected deposit SEM image of deposits on polycrystalline grain #55 and areas where shape was measured

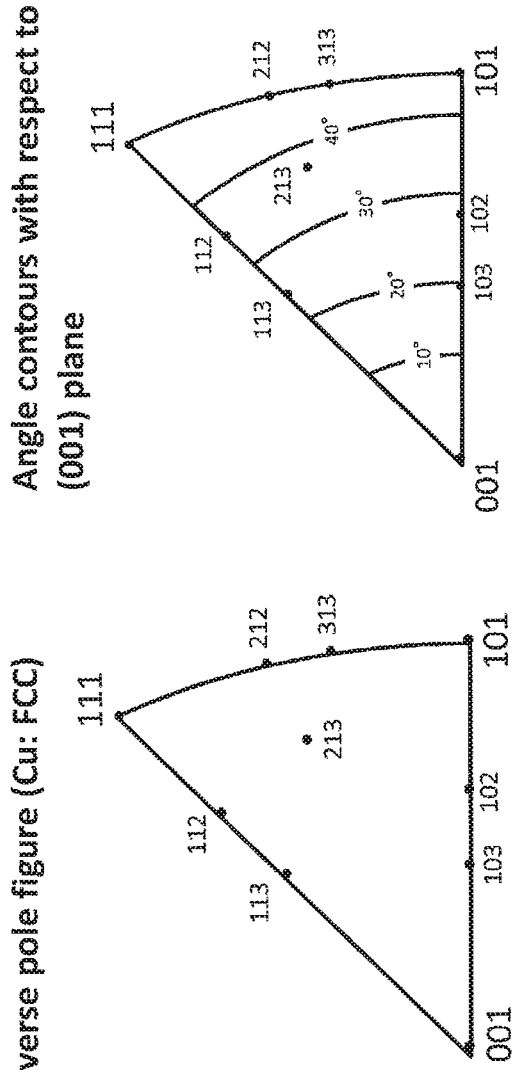
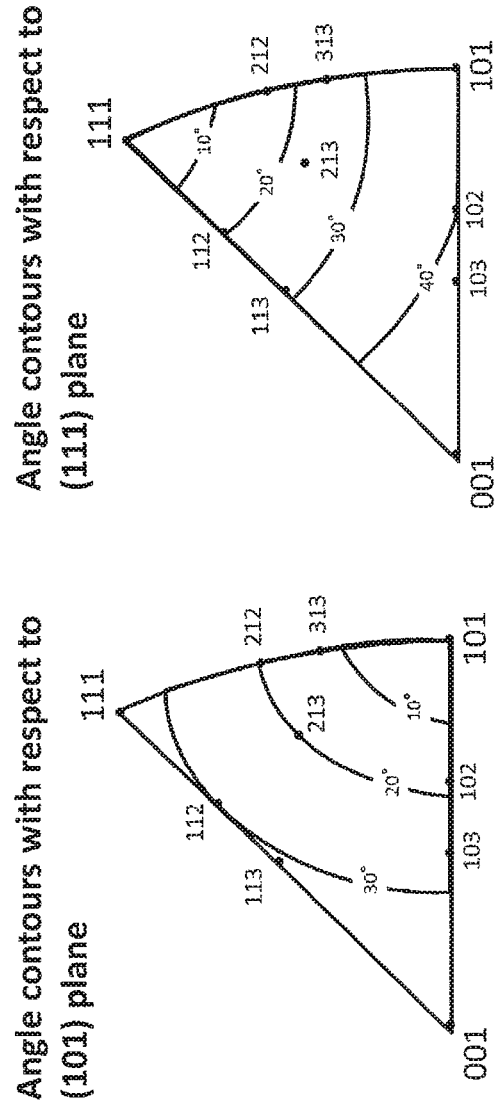
FIG. 15

| Physical constant | | Literature |
|---|---|---|
| Elementary charge: $e$ | $1.60 \times 10^{-9}$ C | |
| Boltzmann constant: $k$ | $1.38 \times 10^{-23}$ J K$^{-1}$ | |
| Experimental value | | |
| Electrode surface area: $s$ | $1.96 \times 10^{-3}$ cm$^{-2}$ | |
| Current value: $i$ | $5.0 \times 10^{-3}$ A cm$^{-2}$ | |
| Temperature: $T$ | 293 K | |
| Li-related literature value | | |
| Atomic volume: $v$ | $2.16 \times 10^{-23}$ cm$^{-3}$ | [1] |
| Interfacial energy: $\sigma$ | $4.0 \times 10^{-5}$ J cm$^{-2}$ | [1] |
| Exchange current density: $i_0$ | $5.5 \times 10^{-3}$ A cm$^{-2}$ | [2] |
| Non-Li-related literature value (nucleation of Ag on Pt current collector) | | |
| Constant related to nucleation: $K_1$ | $1.0 \times 10^{-2}$ V$^2$ | [3] |
| Constant related to nucleation: $K_2$ | $1.0 \times 10^{7}$ cm$^{-2}$ s$^{-1}$ | [3] |
| Electric double layer capacitance: $C_d$ | $8.0 \times 10^{-5}$ F cm$^{-2}$ | [3] |

[1] David R. Ely, R. Edwin Garcia, *J. Electrochem. Soc.*, 160(4) (2013) A662-A668.

[2] N. Munichandraiah, L. G. Scanlon, R. A. Marsh, B. Kumar, A. K. Sircar, *J. Electroanal. Chem.*, 379 (1994) 495-499.

[3] Vladimir A. Isaev, Olga V. Grishenkova, *J Solid State Electrochem.*, 18 (2014) 2383-2386.

FIG.29

(a) Discharging
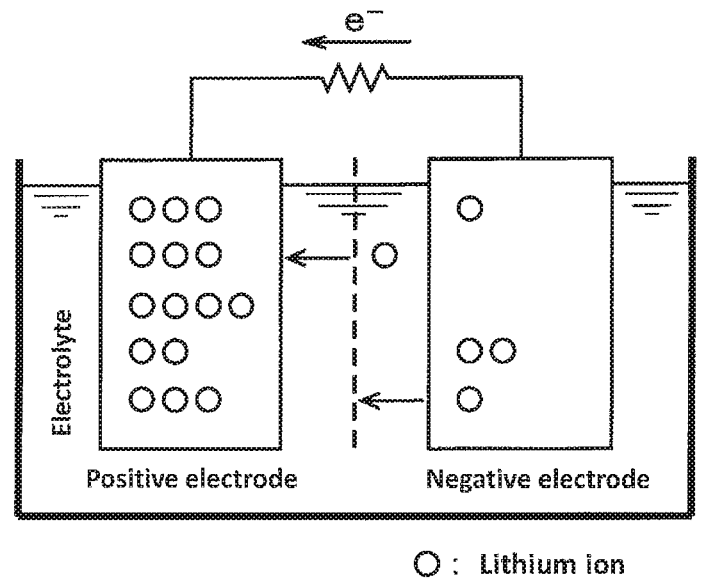
○: Lithium ion
(b) Charging
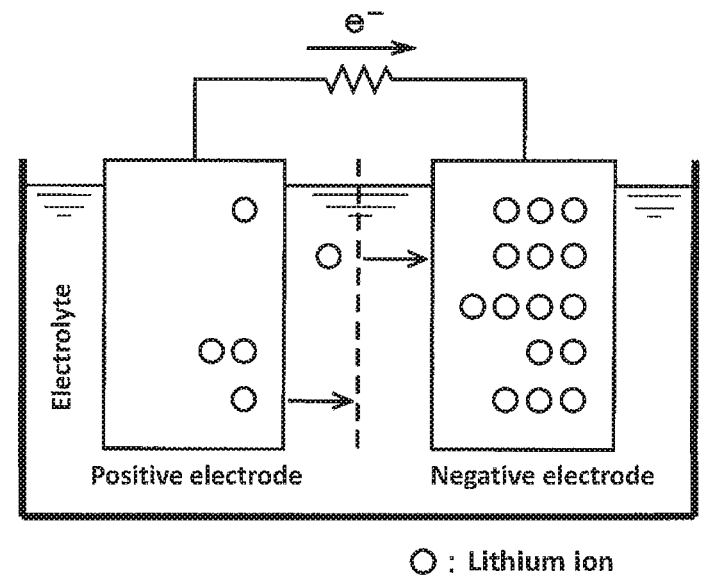
○: Lithium ion
FIG.32

LITHIUM SECONDARY BATTERY

This application is a continuation of PCT/JP2017/024698 filed on Jul. 5, 2017, which claims foreign priority of Japanese Patent Application No. 2016-139352 filed on Jul. 14, 2016, the entire contents of both of which are incorporated herein by reference.

BACKGROUND OF THE INVENTION

1. Field of the Invention

The present disclosure relates to a lithium secondary battery.

2. Description of Related Art

The standard electrode potential of metal lithium is −3.01 [V], which is the lowest value among all metal elements under standard conditions. Since an electrode potential difference between a positive electrode and negative electrode corresponds to the electromotive force of a battery, a metal lithium negative electrode is theoretically a material capable of constituting a battery having the highest electromotive force. Additionally, since metal lithium is the lightest among all metal elements and has a large amount of electric charge per mass, the metal lithium negative electrode is also a material capable of constituting a battery increasing the amount of electric charge stored per weight. Energy drawn from a battery is calculated as a product of the electromotive force and the amount of stored electric charge, and thus the metal lithium negative electrode is an ideal material to achieve a high energy density. For such reasons, the metal lithium negative electrode is deemed very promising as a material for a secondary battery mounted on an electric automobile on which it is difficult to load a heavy power source.

The metal lithium negative electrode is potentially a negative electrode of a storage battery because lithium ions dissolved by a discharge reaction (oxidation) revert to metal lithium upon a charge reaction (reduction). However, there is a problem in that when the lithium ions revert to metal lithium upon the charge reaction, the metal lithium is dendritically (arborescently) deposited on the negative electrode current collector which is a base and the dendritically deposited metal lithium causes a short circuit. In addition, there is another problem in terms of safety and reliability: Since metal lithium is a water-prohibiting substance, an organic solvent, which is generally flammable, has to be used in an electrolyte, and thus the short circuit can cause thermal runaway in a battery.

Against the problem of dendritic deposition of metal lithium on a negative electrode current collector, countermeasures have been taken with various techniques. Patent Literature 1, for example, discloses a technique using a metal having a ten point height of roughness profile (Rz), which is defined by JIS B 0601, of 10 μm or less as a negative electrode current collector, for example. Patent Literature 2, for example, discloses a technique using an amorphous metal as a negative electrode current collector.

CITATION LIST

Patent Literature

Patent Literature 1: JP 2001-243957 A
Patent Literature 2: JP 2001-250559 A

SUMMARY OF THE INVENTION

Technical Problem

The present disclosure provides a negative electrode current collector and lithium secondary battery capable of reducing the phenomenon in which metal lithium is dendritically deposited.

Solution to Problem

A lithium secondary battery according to an aspect of the present disclosure has a positive electrode, an electrolyte containing lithium ions, and a negative electrode current collector having a surface on which a lithium metal or a lithium alloy is deposited/dissolved. The negative electrode current collector has a crystal structure. In the surface of the negative electrode current collector, a group comprising at least one region whose principal crystal plane is a close-packed plane of the crystal structure or an off plane having an off-angle of 20° or less with respect to the close-packed plane occupies the largest area among three or four groups each comprising at least one region having a principal crystal plane three of whose Miller indices are each represented by 0 or 1 or an off-plane having an off-angle of 20° or less with respect to the principal crystal plane, the principal crystal plane being different for each of the three or four groups.

Advantageous Effects of Invention

The lithium secondary battery according to the aspect of the present disclosure can reduce dendritic deposition of metal lithium on the negative electrode current collector.

BRIEF DESCRIPTION OF THE DRAWINGS

FIG. 15 shows angle contours on inverse pole figures.

FIG. 29 shows constants.

FIG. 32 shows a mode of charge and discharge of a metal lithium battery.

DETAILED DESCRIPTION

An embodiment of the present disclosure is described hereinafter with reference to the drawings.

First, a mechanism in which metal lithium is dendritically deposited on a negative electrode current collector in a metal lithium negative electrode is described from the perspective of crystal growth. Specifically, on the basis of the fact that the deposit shape of an electrochemically deposited metal is influenced by a crystal plane of a current collector which is a base, a prediction was made that, also in the case of a metal lithium negative electrode, the deposit shape of a metal deposited on a negative electrode current collector is influenced by a crystal plane of the negative electrode current collector which is a base. In the present disclosure, a relation between crystal planes of a negative electrode current collector and the deposit shape of deposits was determined in the following manner: the crystal planes of the negative electrode current collector were analyzed; metal lithium was caused to be deposited on the negative electrode current collector; and the average diameter and standard deviation of diameters of the metal lithium having been deposited on the negative electrode current collector were determined. In the present disclosure, unless otherwise specified, the "diameter" of a deposit means the maximum Feret diameter of the deposit observed in a SEM image. The unit "um" presented in FIGS. 8, 10, 14, and 16 to 18 means "μm".

Hereinafter, (1) Method of electrolysis experiments and (2) Results and discussion are sequentially described.

(1) Method of Electrolysis Experiments

For a method of electrolysis experiments, the following are sequentially described.

Figure 1:
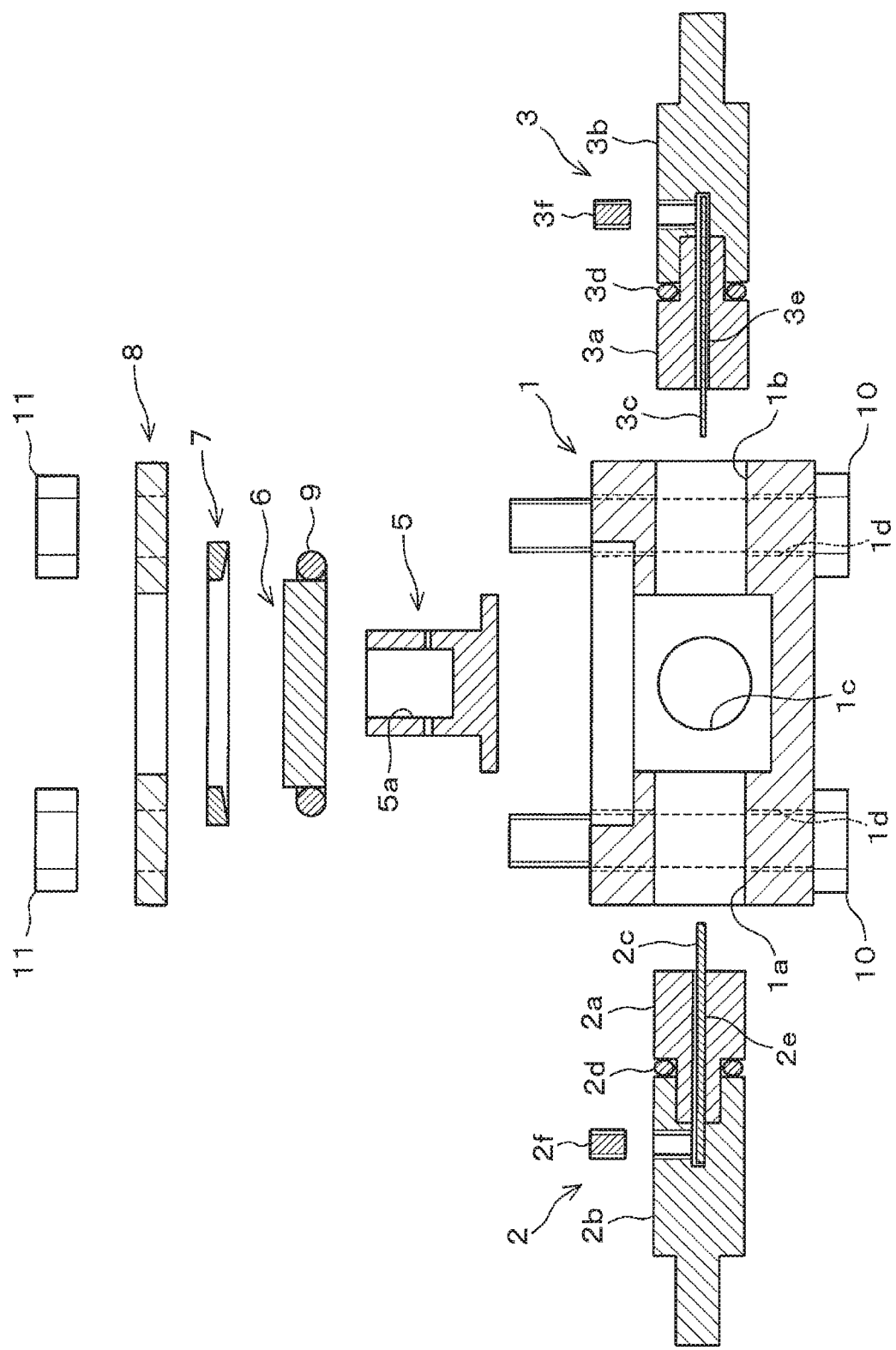
FIG. 1 is an exploded view of an electrolytic cell.
Figure 2:
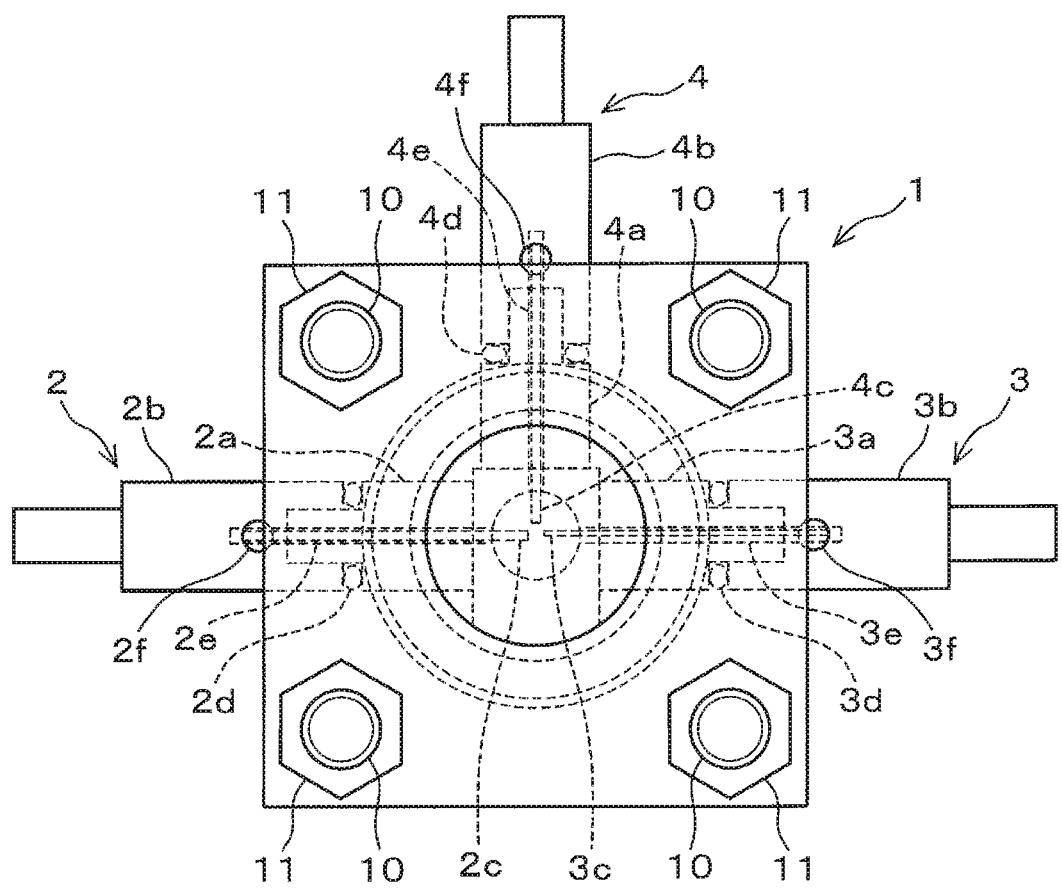
FIG. 2 is a plan view of the electrolytic cell.
Figure 3:
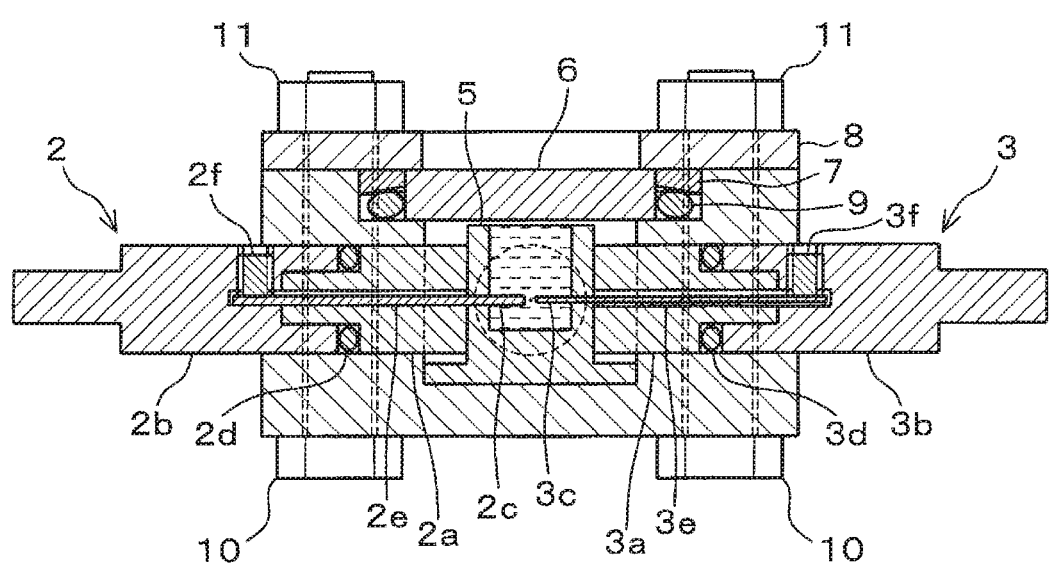
FIG. 3 is a vertical cross-sectional side view of the electrolytic cell.

(1-1) Configuration of electrolytic cell
(1-2) Processing and evaluation of negative electrode current collector
(1-3) Experimental conditions
(1-1) Configuration of Electrolytic Cell As shown in FIG. 1 to FIG. 3, an electrolytic cell is composed of a combination of an outer cell 1, three electrode members 2 to 4, an inner cell 5, window 6, gland follower 7, and stainless steel cover 8.

The outer cell 1 has a function as a container holding the inner cell 5 therein and a function of fixing each of the three electrode members 2 to 4 by fitting an O-ring. Polytetrafluoroethylene (PTFE) is used as a material for the outer cell 1 to prevent dissolution thereof by an electrolyte to be injected in the inner cell 5.

The three electrode members 2 to 4 are, respectively, the electrode member 2 for a positive electrode current collector, the electrode member 3 for a negative electrode current collector, and the electrode member 4 for a reference electrode. The electrode member 2 for the positive electrode current collector is composed of a combination of a Teflon (registered trademark) portion 2a, stainless steel portion 2b, and a positive electrode current collector 2c. The electrode member 3 for the negative electrode current collector is composed of a combination of a Teflon portion 3a, stainless steel portion 3b, and negative electrode current collector 3c. The electrode member 4 for the reference electrode is composed of a combination of a Teflon portion 4a, stainless steel portion 4b, and reference electrode 4c. As is the case for the outer cell 1, PTFE is used as a material for the Teflon portions 2a, 3a, and 4a of the electrode members to prevent dissolution thereof by the electrolyte.

The inner cell 5 has an injection portion 5a in which the electrolyte is injected. As is the case for the outer cell 1, PTFE is used as a material for the inner cell 5 to prevent dissolution thereof by the electrolyte. A transparent quartz glass is used as a material for the window 6 to make it possible to observe the inside of the inner cell 5 from the top of the outer cell 1. The gland follower 7 has a function of pressing down the window 6 together with an O-ring 9 to prevent the electrolyte from making a contact with the outside air. Stainless steel is used as a material for the gland follower 7. The stainless steel cover 8 has a function of fixing the inner cell 5, window 6, and gland follower 7 to the outer cell 1 when laid over the outer cell 1.

The electrolytic cell shown in FIG. 2 and FIG. 3 is assembled by combining these components 1 to 8. Assembling of the electrolytic cell is carried out in a glove box under argon atmosphere in accordance with the steps described hereinafter.

Step 1: The inner cell 5 is placed inside the outer cell 1.

Step 2: The three electrode members 2 to 4 are assembled separately. The electrode member 2 for the positive electrode current collector is assembled by placing an O-ring 2d between the Teflon portion 2a and stainless steel portion 2b, inserting the positive electrode current collector 2c into a hole 2e from the front side of the Teflon portion 2a, and fixing a first end of the positive electrode current collector 2c to the stainless steel portion 2b using a setscrew 2f with a second end of the positive electrode current collector 2c exposed. The electrode member 3 for the negative electrode current collector is assembled by placing an O-ring 3d between the Teflon portion 3a and stainless steel portion 3b, inserting the negative electrode current collector 3c into a hole 3e from the front side of the Teflon portion 3a, and fixing a first end of the negative electrode current collector 3c to the stainless steel portion 3b using a setscrew 3f with a second end of the negative electrode current collector 3c exposed. The electrode member 4 for the reference electrode is assembled by placing an O-ring 4d between the Teflon portion 4a and stainless steel portion 4b, inserting the reference electrode 4c into a hole 4e from the front side of the Teflon portion 4a, and fixing a first end of the reference electrode 4c to the stainless steel portion 4b using a setscrew 4f with a second end of the reference electrode 4c exposed.

Step 3: The electrode members 2 to 4 are inserted into holes 1a to 1c of the outer cell 1 respectively so that the second ends of the positive electrode current collector 2c, negative electrode current collector 3c, and reference electrode 4c are located in the injection portion 5a of the inner cell 5.

Step 4: Four hexagonal head bolts 10 are inserted into four through holes 1d of the outer cell 1.

Step 5: The electrolyte is injected into the injection portion 5a of the inner cell 5 using a dropper.

Step 6: The O-ring 9 is fitted around the window 6, and they are placed on the inner cell 5.

Step 7: The gland follower 7 is laid over the window 6 and O-ring 9.

Step 8: The stainless steel cover 8 is laid over the outer cell 1 and fixed by screwing four hexagonal nuts 11 on the four hexagonal head bolts 10.

The positive electrode current collector 2c, negative electrode current collector 3c, reference electrode 4c, and electrolyte are as follows:

Positive electrode current collector 2c: Metal lithium (ø 1 mm)

Negative electrode current collector 3c: Fine wire of polycrystalline copper (ø 500 μm)

Reference electrode 4: Metal lithium (ø 1 mm)

Electrolyte: 1.0 M $LiPF_6$ (EC:MEC=30:70)

EC: Ethylene carbonate

MEC: Methyl ethyl carbonate

Figure 4:
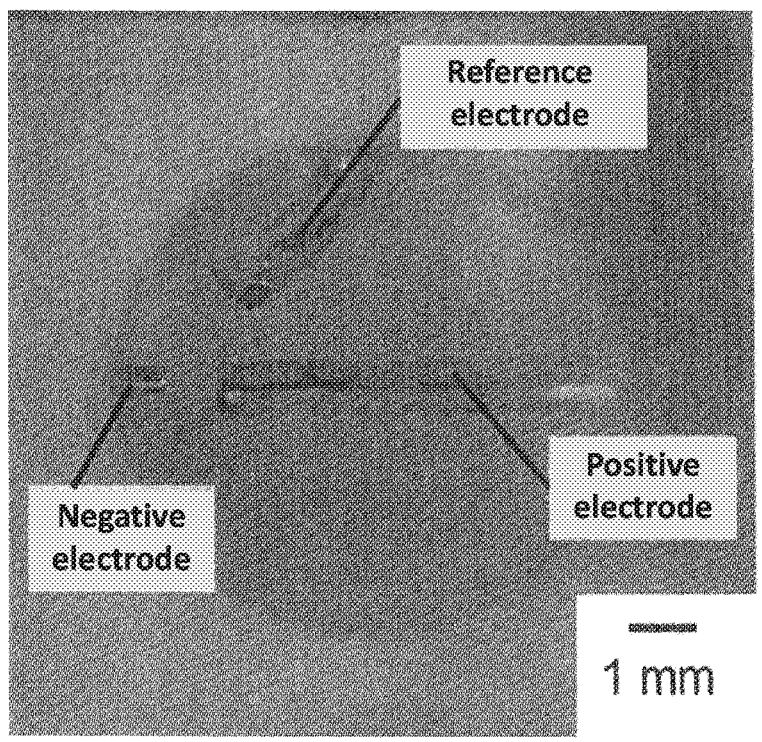
FIG. 4 shows arrangement of a positive electrode current collector, negative electrode current collector, and reference electrode.

FIG. 4 shows arrangement of the positive electrode current collector 2c, negative electrode current collector 3c, and reference electrode 4c. They were placed in such a manner that the positive electrode current collector 2c and negative electrode current collector 3c face each other and that the reference electrode 4c is located between the positive electrode current collector 2c and negative electrode current collector 3c.

Figure 5:
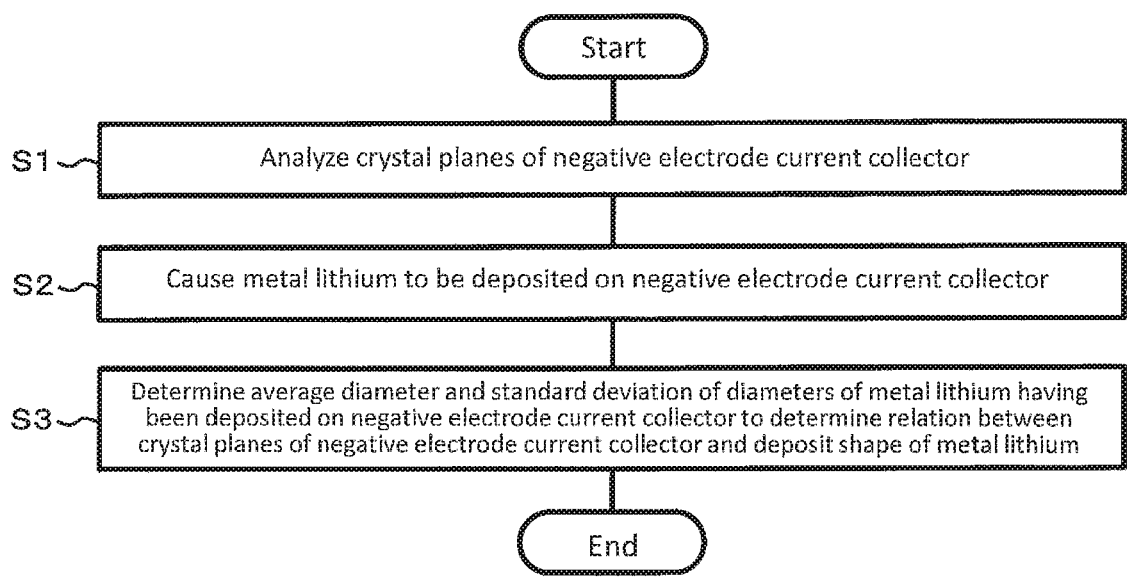
FIG. 5 is a flowchart showing steps.

Subsequently, as shown in FIG. 5, the following steps (S1 to S3) were carried out using the electrolytic cell assembled in the above manner: a step (S1) of analyzing crystal planes of the negative electrode current collector; a step (S2) of causing metal lithium to be deposited on the negative electrode current collector; and a step (S3) of determining the average diameter and standard deviation of diameters of the metal lithium having been deposited on the negative electrode current collector to determine a relation between the crystal planes of the negative electrode current collector and the deposit shape of the metal lithium.

(1-2) Processing and Evaluation of Negative Electrode Current Collector

A cross section of the fine wire of polycrystalline copper used as the negative electrode current collector was polished and crystal planes thereof were analyzed by electron backscatter diffraction (EBSD).

(1-3) Experimental Conditions

Metal lithium was caused to be deposited on the negative electrode current collector by discharge and charge reactions with a predetermined current density and a predetermined amount of charge. The experimental conditions of the current density and amount of charge are as follows:

Current density: 5.0 $mA/cm^2$

Amount of charge: 0.1 $mAh/cm^2$ (short-time charging)

1.0 $mAh/cm^2$ (long-time charging)

Figure 6:
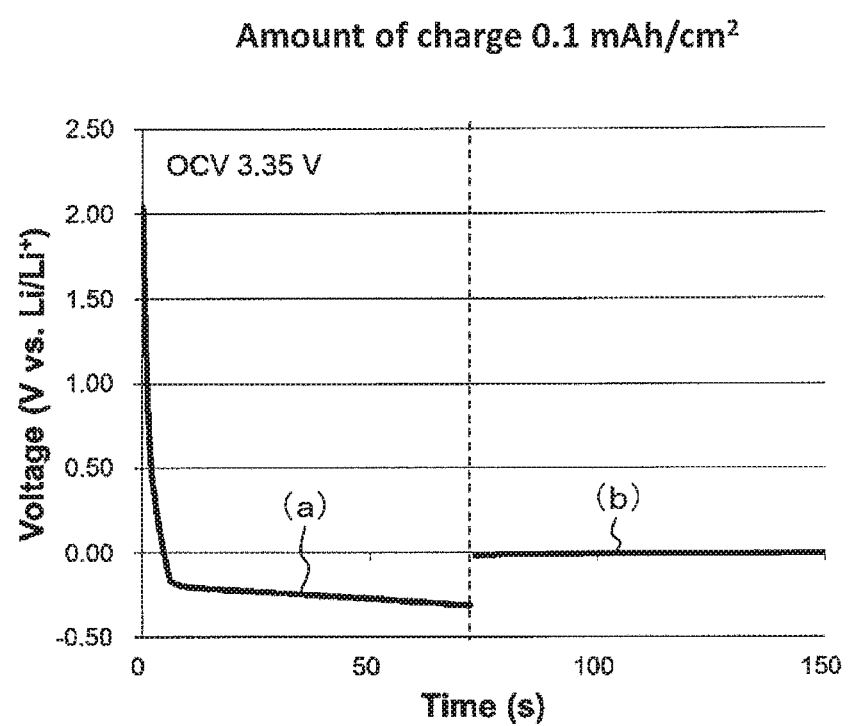
FIG. 6 is a graph showing a voltage-time curve obtained in an electrolysis experiment by short-time charging.

FIG. 6 shows a voltage-time curve obtained in an electrolysis experiment by short-time charging. In FIG. 6, (a) represents electric potential of the negative electrode current collector during charge (current density=5.0 $mA/cm^2$) while (b) represents electric potential of the negative electrode current collector after the charge (current density=0 $mA/cm^2$). In this electrolysis experiment, metal lithium is used as the reference electrode, and thus the electric potential at which a deposition reaction ($Li^+ + e^- \rightarrow Li$) of metal lithium progresses on the negative electrode current collector is 0 V or less. The electric potential of the negative electrode current collector greatly changes to the negative side immediately after the start of the electrolysis. The change of the electric potential slows down about 7 seconds after the start of the electrolysis. It can be thought that an electrical double layer is charged and reaction product film is formed due to decomposition of the electrolyte immediately after the start of the electrolysis, and that metal lithium starts being deposited about 7 seconds after the start of the electrolysis.

Figure 7:
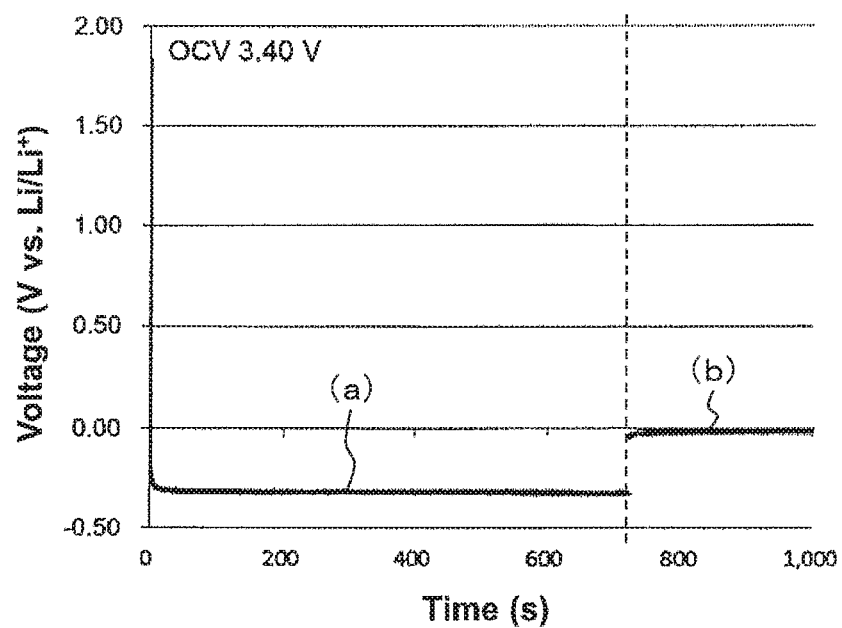
FIG. 7 is a graph showing a voltage-time curve obtained in an electrolysis experiment by long-time charging.

FIG. 7 shows a voltage-time curve obtained in an electrolysis experiment by long-time charging. In FIG. 7, (a) represents electric potential of the negative electrode current collector during charge (current density=5.0 $mA/cm^2$) while (b) represents electric potential of the negative electrode current collector after the charge (current density=0 $mA/cm^2$). Also in this case, the electric potential of the negative electrode current collector greatly changes to the negative side immediately after the start of the electrolysis. It can be thought that an electrical double layer is charged and a reaction product film is formed due to decomposition of the electrolyte immediately after the start of the electrolysis, and that metal lithium starts being deposited about 13 seconds after the start of the electrolysis.

(2) Results and Discussion

For results and discussion, the following are sequentially described.

(2-1) SEM images (2-2) Deposit shape analysis (2-3) Discussion (2-1) SEM Images

Figure 8:
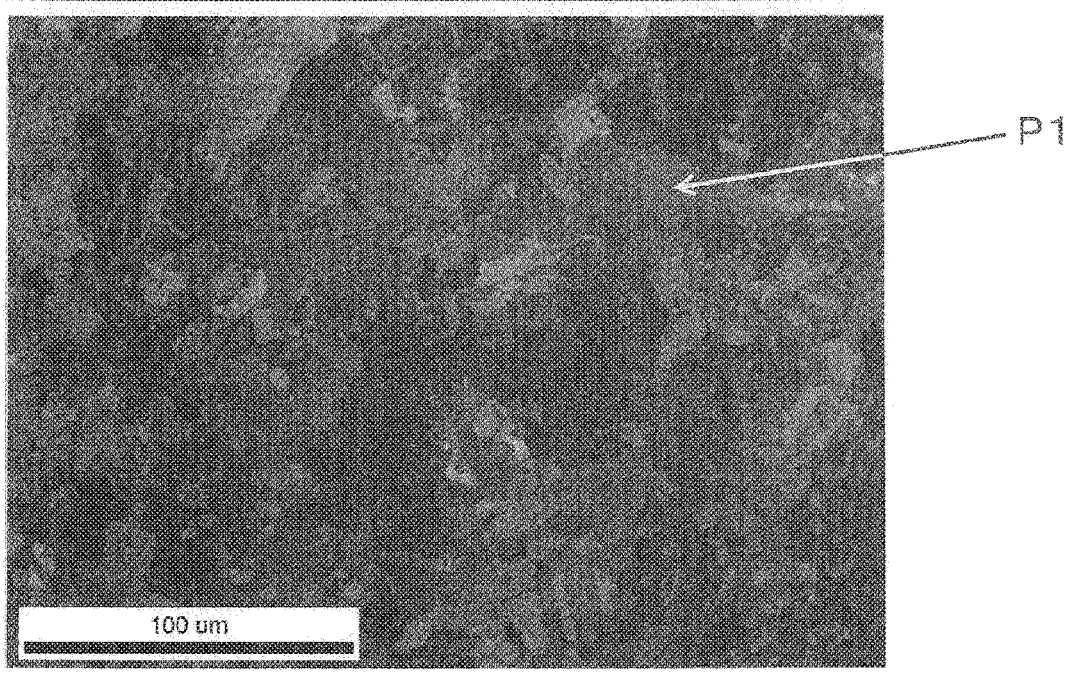
FIG. 8 is a mapping image of crystal planes of the negative electrode current collector observed before the electrolysis experiment by short-time charging.
Figure 9:
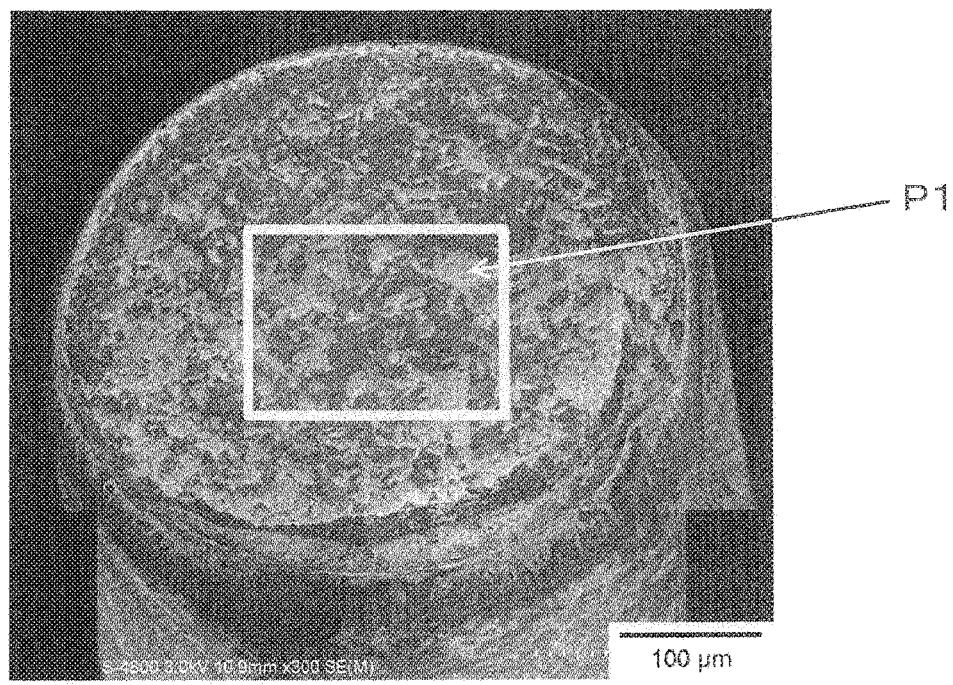
FIG. 9 is a SEM image of deposits observed after the electrolysis experiment by short-time charging.
Figure 10:
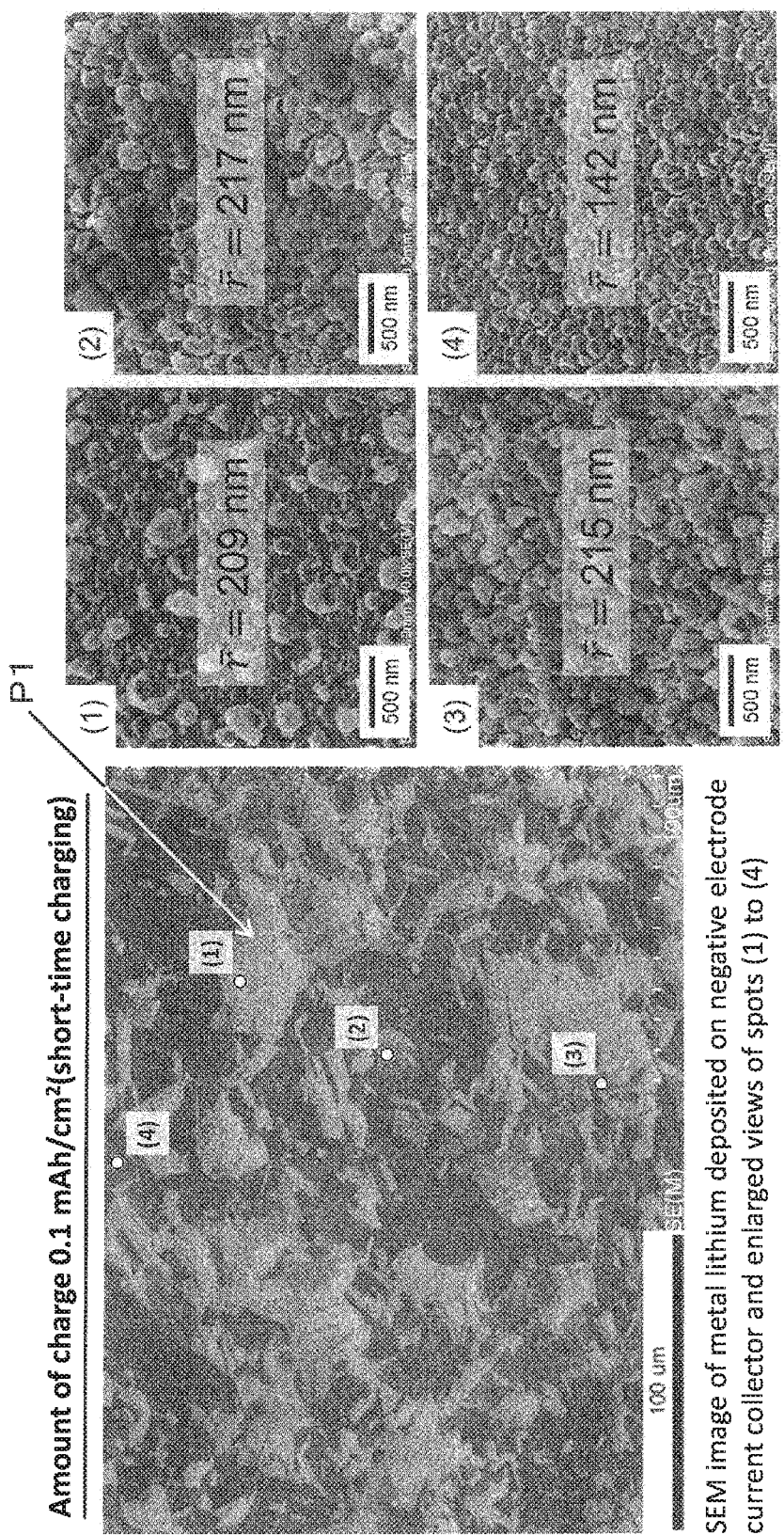
FIG. 10 shows enlarged views of the SEM image.

FIG. 8 shows a mapping image of crystal planes of the negative electrode current collector observed before the electrolysis experiment by short-time charging. FIG. 9 shows a SEM image of metal lithium (deposits) deposited on the negative electrode current collector observed after the electrolysis experiment by short-time charging, and FIG. 10 shows an enlarged view of a part (the region specified by the square) of the SEM image of FIG. 9 and further enlarged views of four randomly selected spots. P1 presented in FIG. 8 to FIG. 10 indicates the same spot. FIG. 10 reveals that each deposit has the shape of a 100 to 200 nm-diameter-hemisphere. FIG. 8 to FIG. 10 reveal that the diameter size of the deposits is influenced by the crystal planes of the negative electrode current collector.

Figure 11:
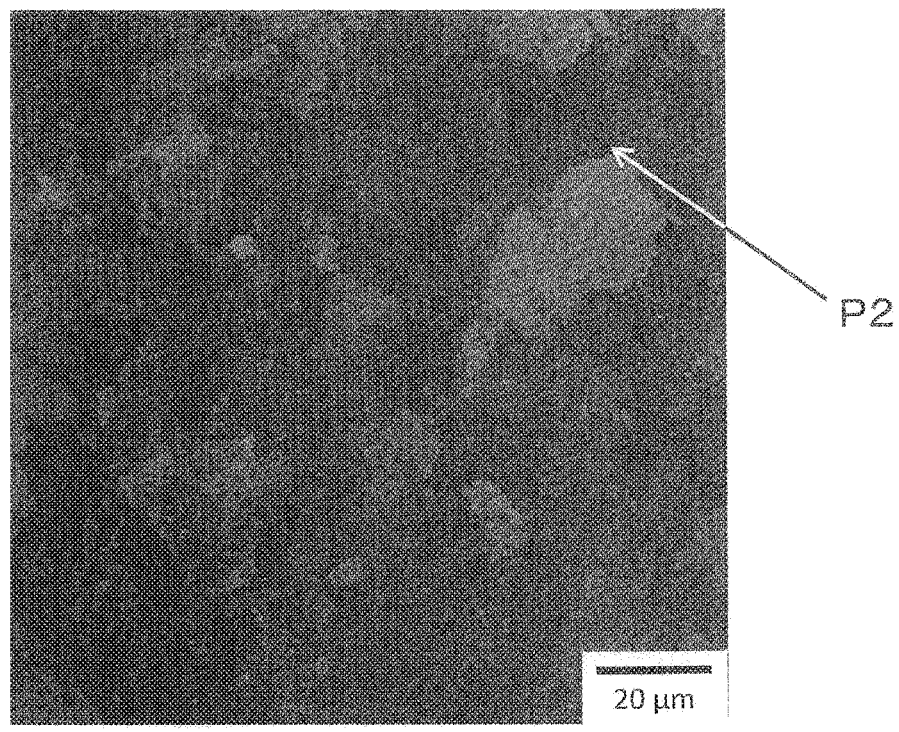
FIG. 11 is a mapping image of crystal planes of the negative electrode current collector observed before the electrolysis experiment by long-time charging.
Figure 12:
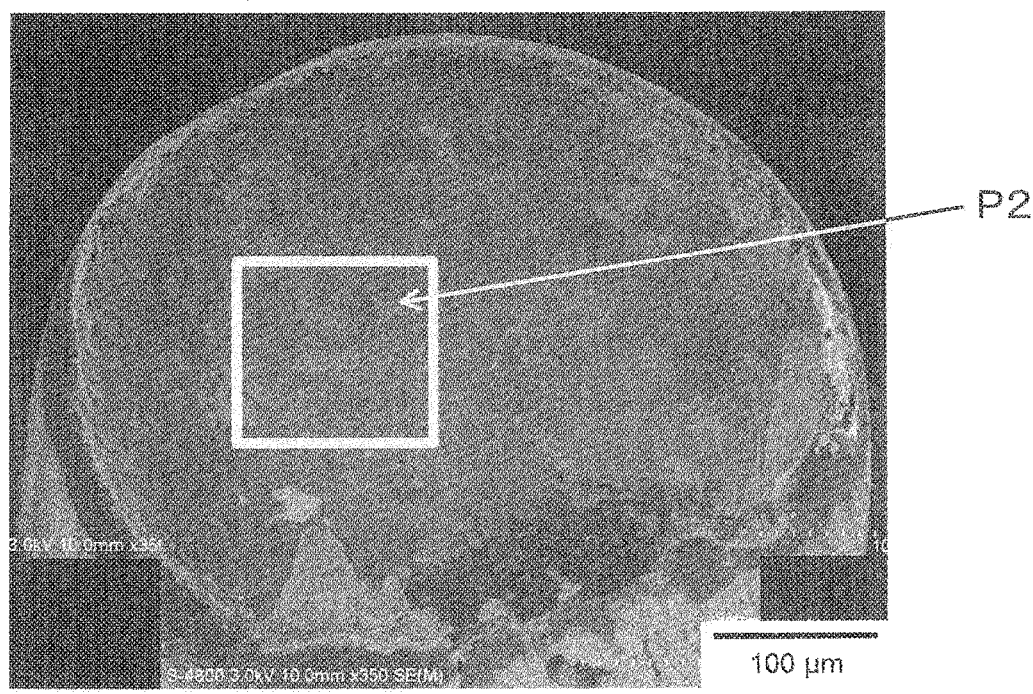
FIG. 12 is a SEM image of deposits observed after the electrolysis experiment by long-time charging.
Figure 13:
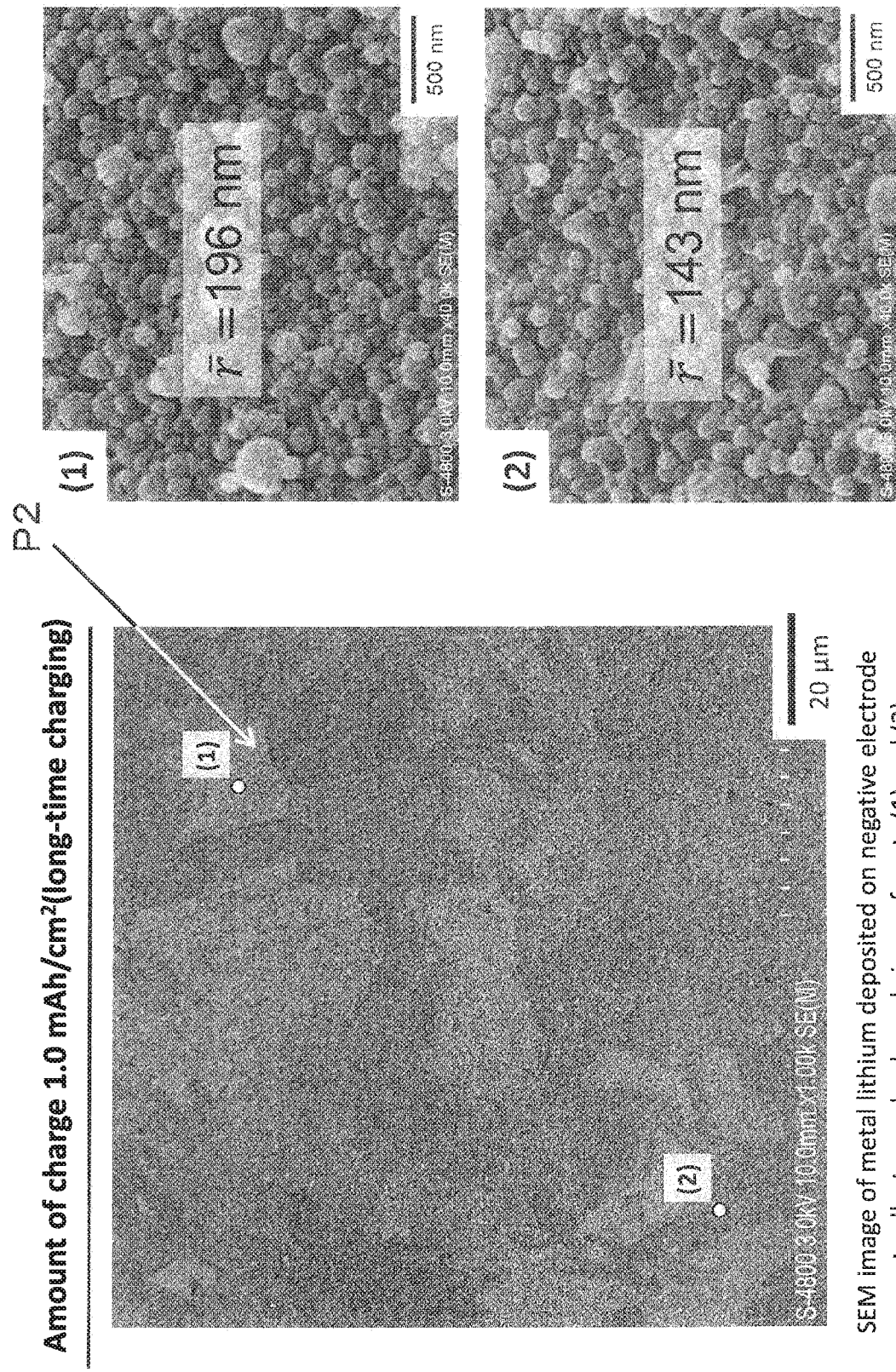
FIG. 13 shows enlarged views of the SEM image.

FIG. 11 shows a mapping image of crystal planes of the negative electrode current collector observed before the electrolysis experiment by long-time charging. FIG. 12 shows a SEM image of metal lithium (deposits) deposited on the negative electrode current collector observed after the electrolysis experiment by long-time charging, and FIG. 13 shows an enlarged view of a part (the region specified by the square) of the SEM image of FIG. 12 and further enlarged views of two randomly selected spots. P2 presented in FIG. 11 to FIG. 13 indicates the same spot. FIG. 13 reveals that each deposit has the shape of a 100 to 200 nm-diameter-hemisphere. FIG. 11 to FIG. 13 reveal that, as in FIG. 8 to FIG. 10, the diameter size of the deposits is influenced by the crystal planes of the negative electrode current collector.

(2-2) Deposit Shape Analysis

Figure 14:
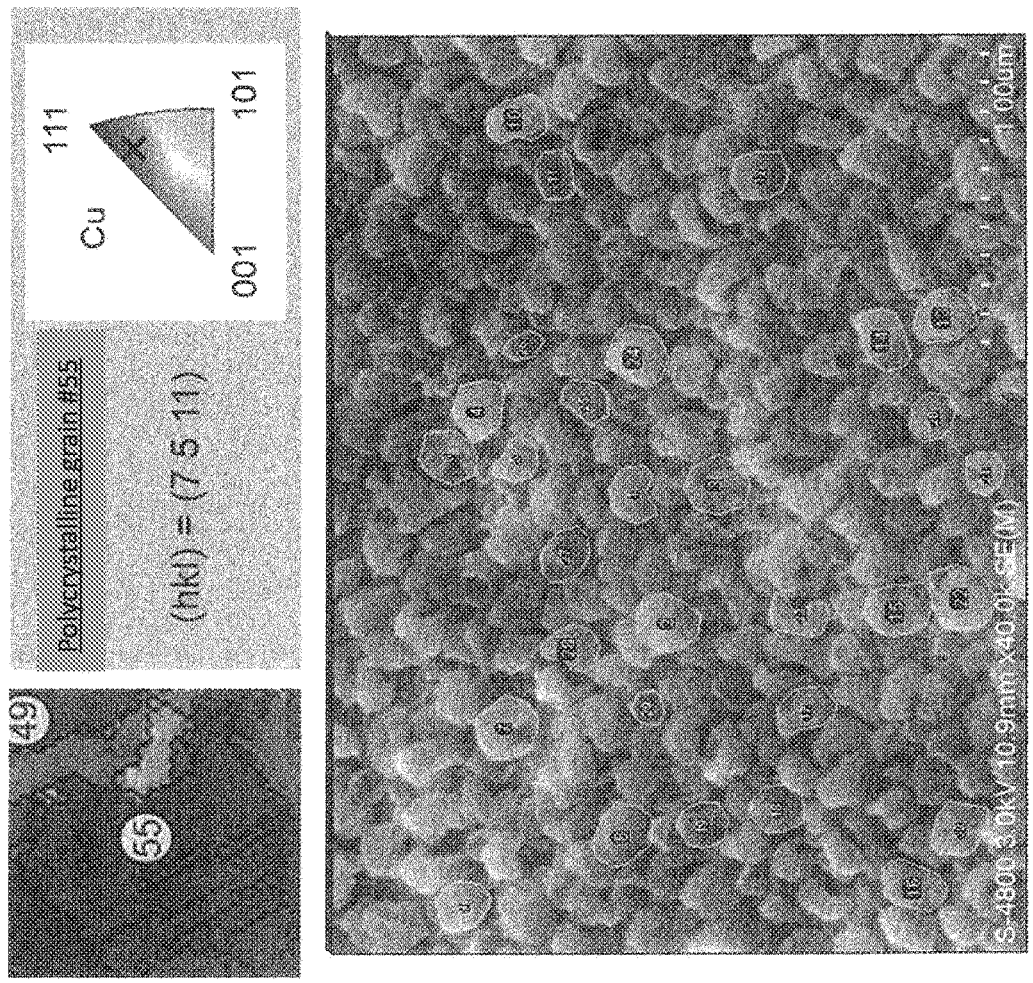
FIG. 14 shows deposit shape analysis.

As shown in FIG. 14, 30 deposit shapes of deposits on a polycrystalline grain were randomly selected and the average diameter r and standard deviation (variation) σ of the diameters were determined by image processing for each polycrystalline grain (#1 to #100). FIG. 14 shows the polycrystalline grain #55 as an example. The average diameter r was determined to be 210 nm and the standard deviation σ was determined to be 0.031. For each of the remaining 99 polycrystalline grains (#1 to #54 and #56 to #100), the average diameter r and standard deviation σ of the diameters were determined in the same manner. The resulting values of the average diameter r and standard deviation σ of the diameters were separately plotted on inverse pole figures to determine the relation between the crystal planes of the negative electrode current collector and the deposit shape of metal lithium.

Figure 16:
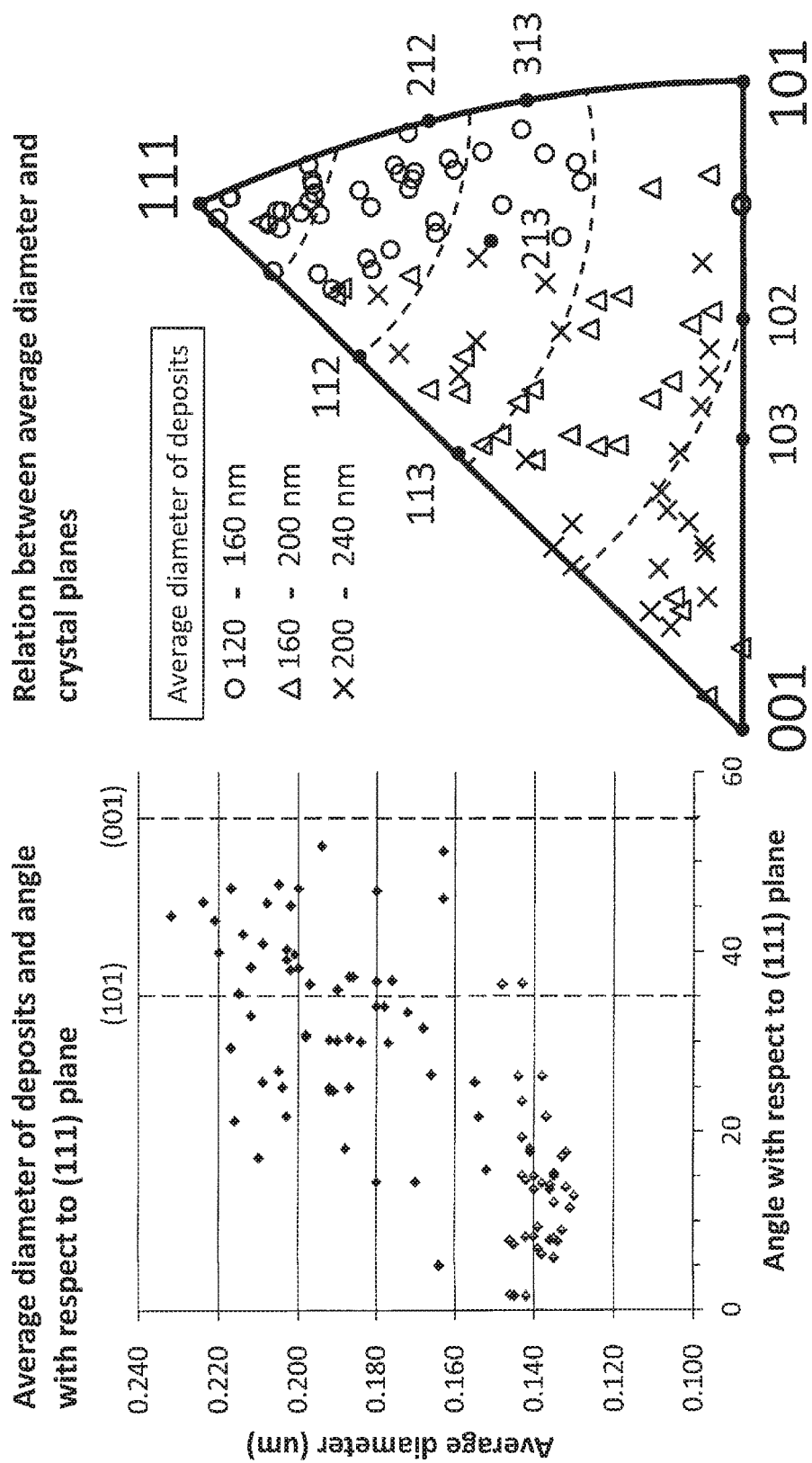
FIG. 16 shows a relation between the average diameter of deposits and the (111) plane.
Figure 17:
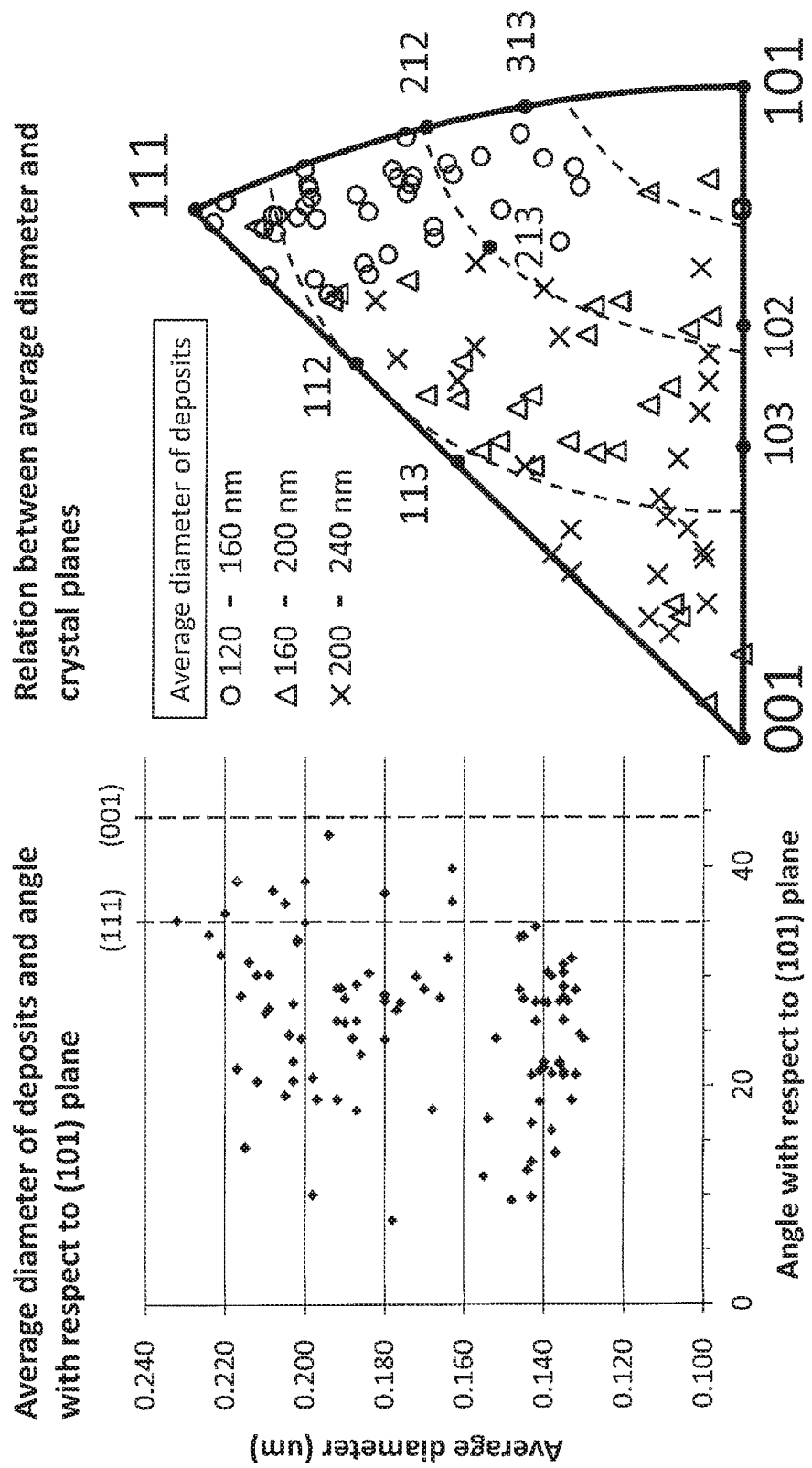
FIG. 17 shows a relation between the average diameter of the deposits and the (101) plane.
Figure 18:
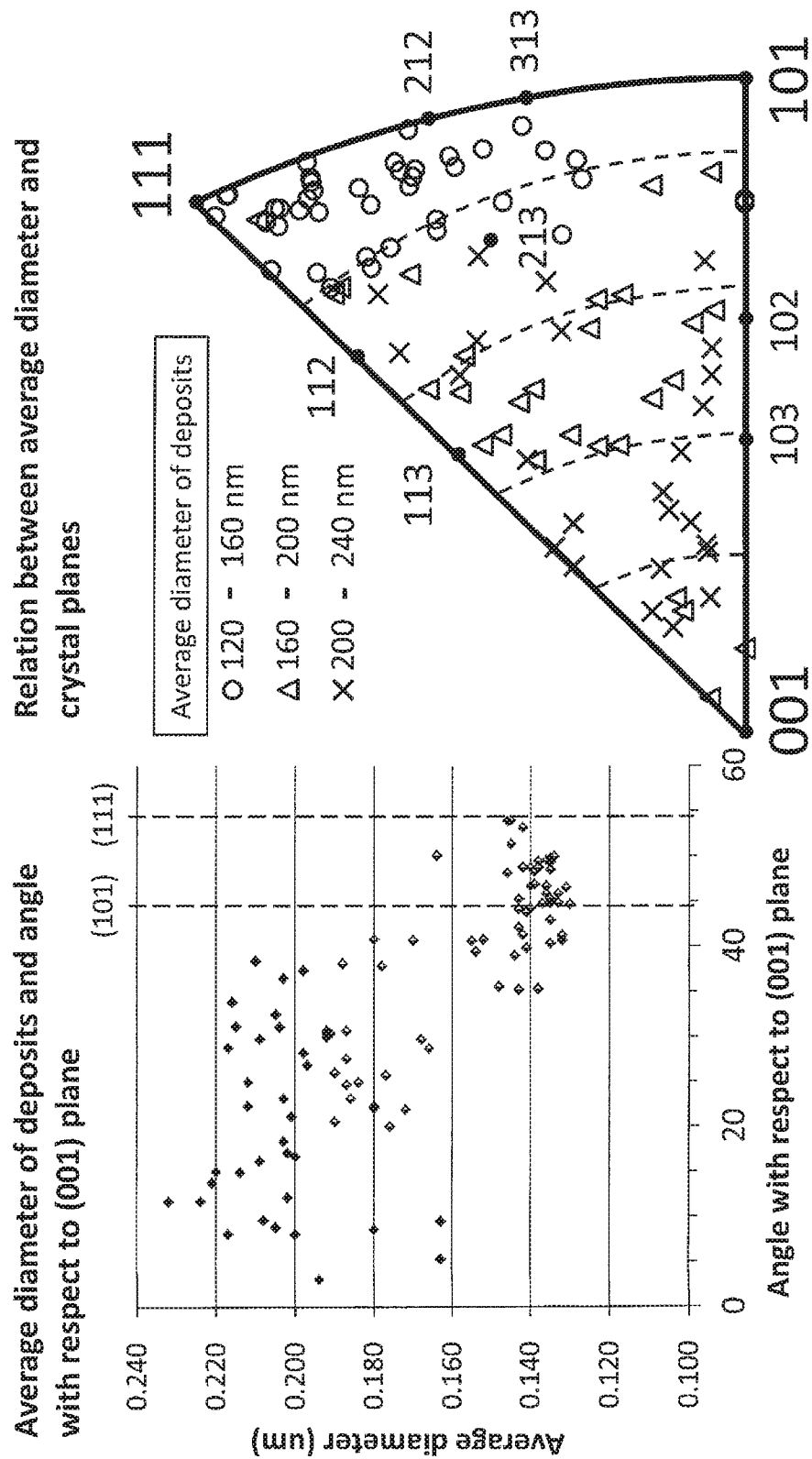
FIG. 18 shows a relation between the average diameter of the deposits and the (001) plane.

FIG. 15 shows an inverse pole figure of a face-centered cubic (FCC) structure and angle contours with respect to the (111) plane, (101) plane, and (001) plane. FIG. 16 to FIG. 18 respectively show relations of the average diameter of the deposits with the (111) plane, (101) plane, and (001) plane of the negative electrode current collector. FIG. 16 to FIG. 18 reveal the following facts:

The average diameter of the deposits is smallest on crystal planes close to the (111) plane.

The average diameter of the deposits is relatively large on crystal planes (or high-index planes) away from the (111) plane, (101) plane, and (001) plane.

Therefore, the following relation is established between the crystal planes of the negative electrode current collector and the average diameter of the deposits:

$r(111)\text{plane} < r(101)\text{plane} \approx r(001)\text{plane} < r(\text{high-index planes})$ As shown in FIG. 16, each of the average values of the particle diameters of the deposits deposited on crystal planes having an angle of 15° or less with respect to the (111) plane was within the range of 120 nm to 200 nm. Moreover, each of the average values of the particle diameters of the deposits deposited on crystal planes having an angle of 5° or less with respect to the (111) plane was within the range of 120 nm to 160 nm.

Figure 19:
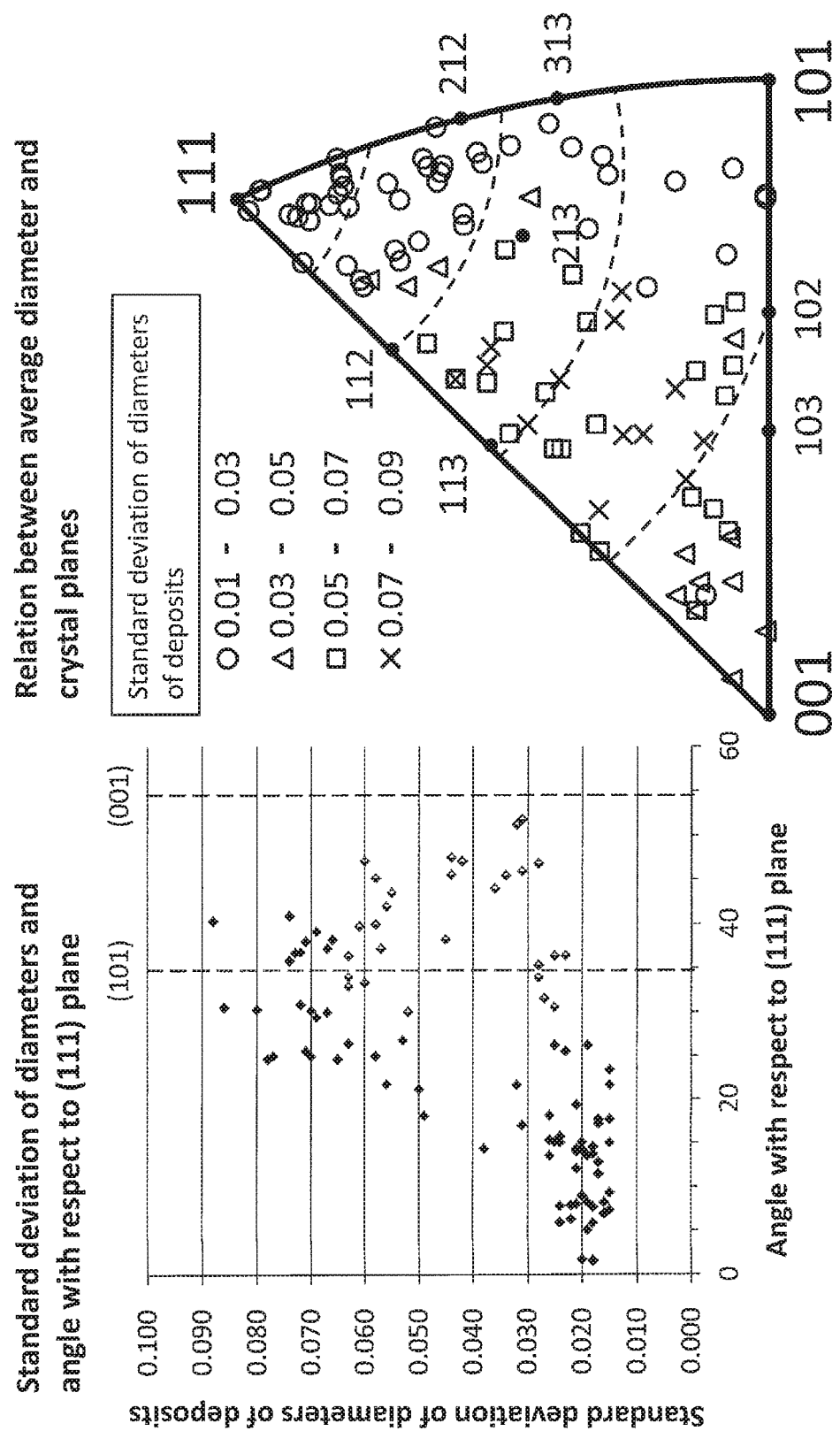
FIG. 19 shows a relation between the standard deviation of the diameters of the deposits and the (111) plane.
Figure 20:
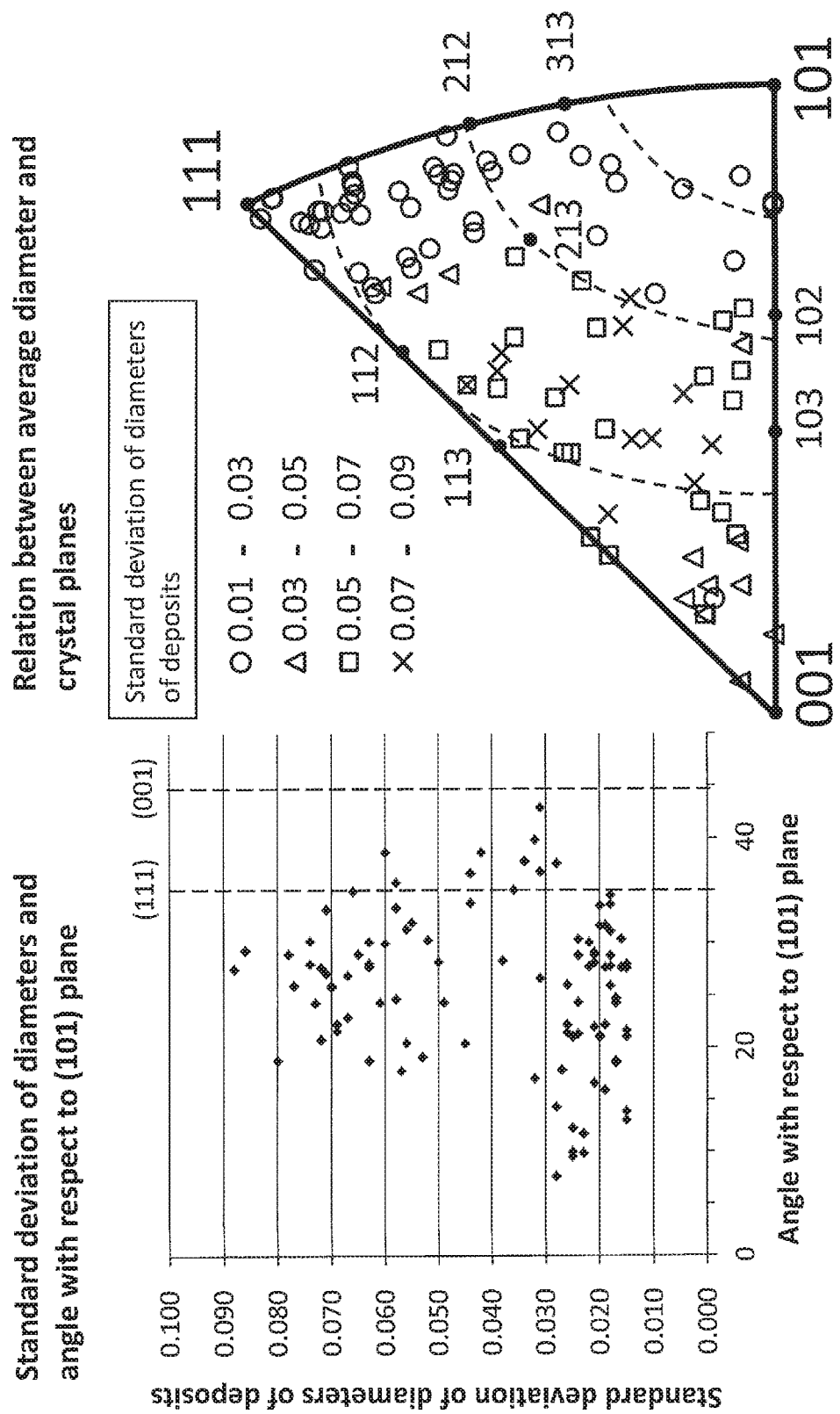
FIG. 20 shows a relation between the standard deviation of the diameters of the deposits and the (101) plane.
Figure 21:
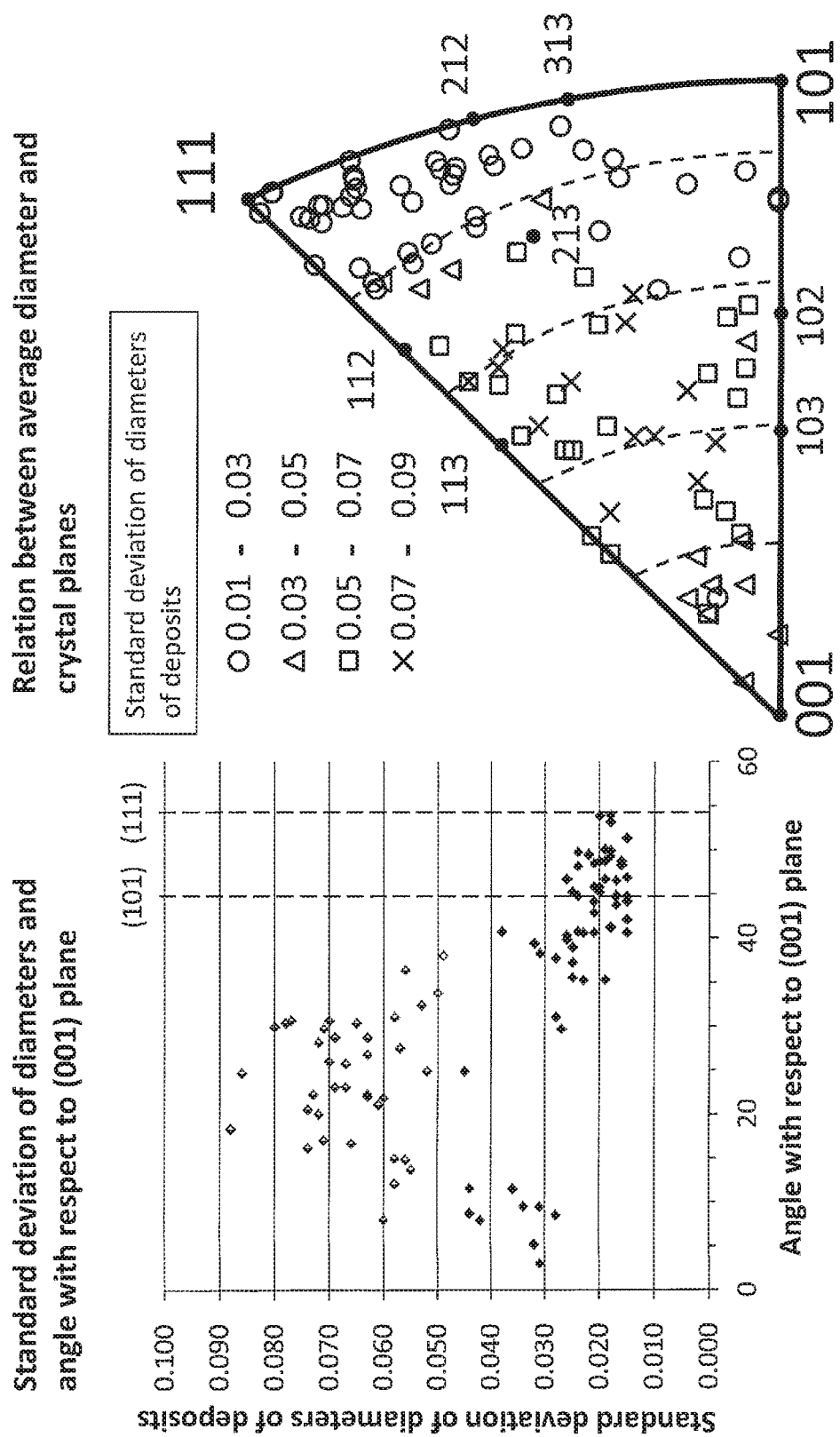
FIG. 21 shows a relation between the standard deviation of the diameters of the deposits and the (001) plane.
Figure 22:
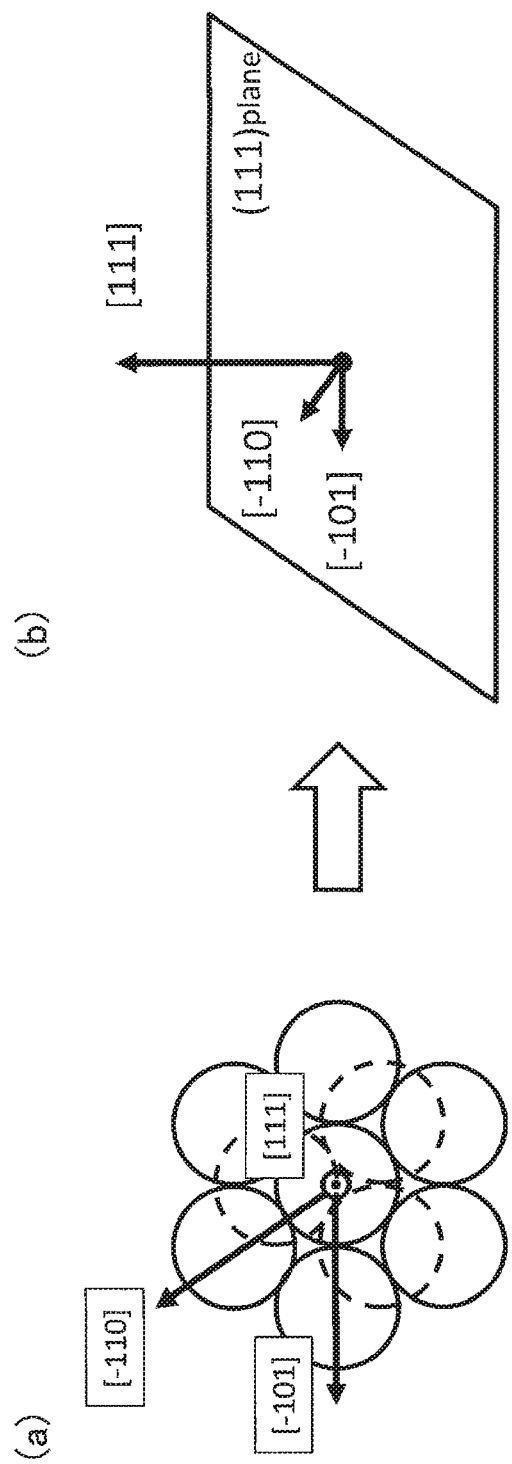
FIG. 22 shows schematic diagrams of the (111) plane, the [−110] zone axis, and the [−101] zone axis of an FCC structure.
Figure 23:
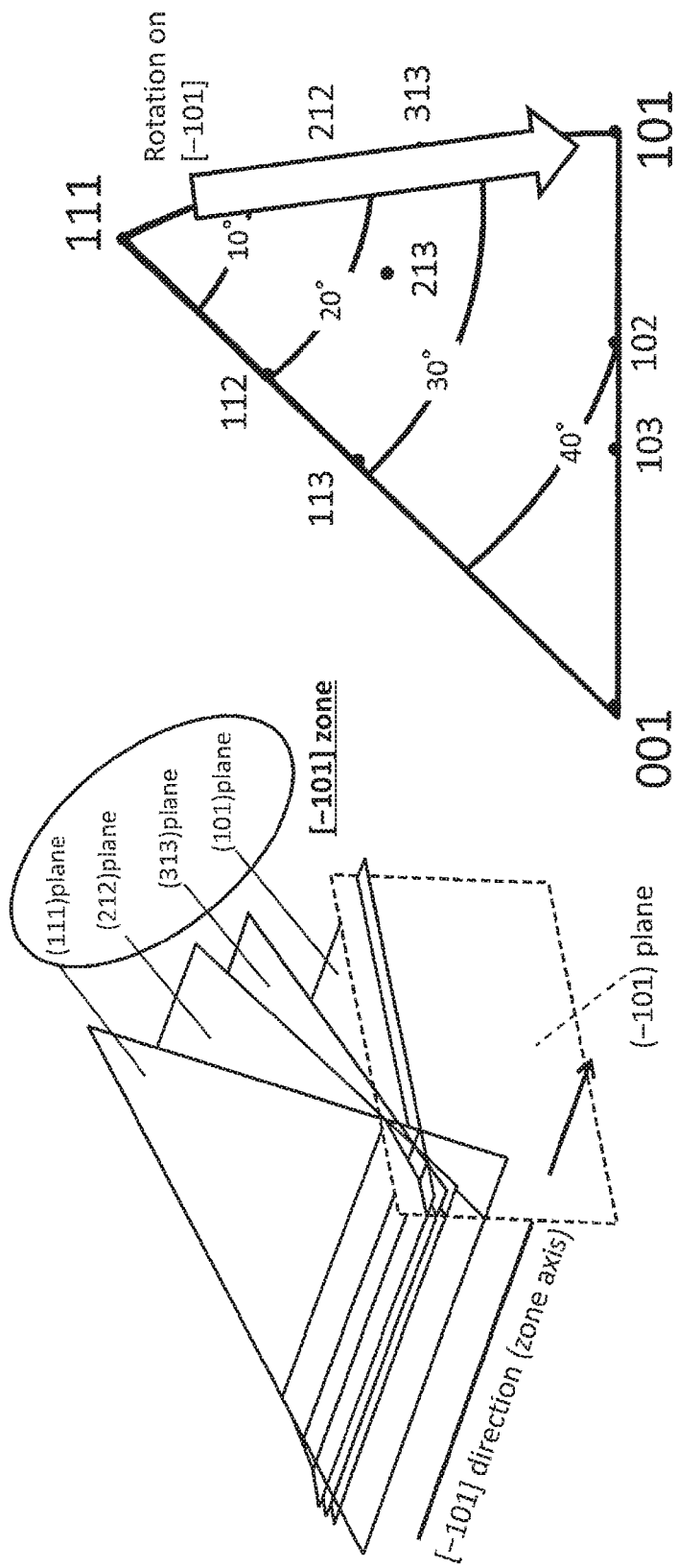
FIG. 23 shows a relation between a schematic diagram of the [−101] zone and an inverse pole figure.
Figure 24:
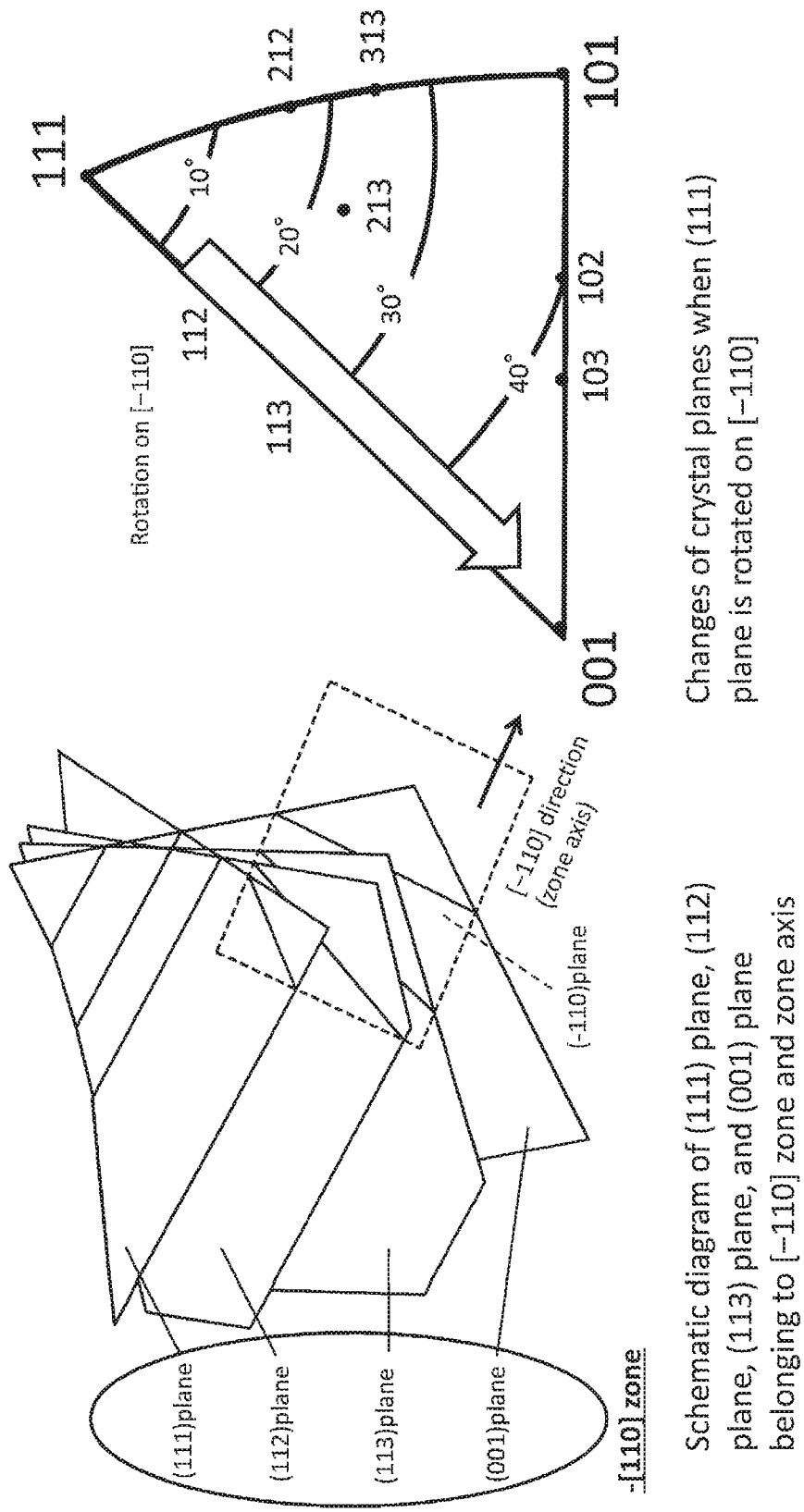
FIG. 24 shows a relation between a schematic diagram of the [−110] zone and an inverse pole figure.
Figure 25:
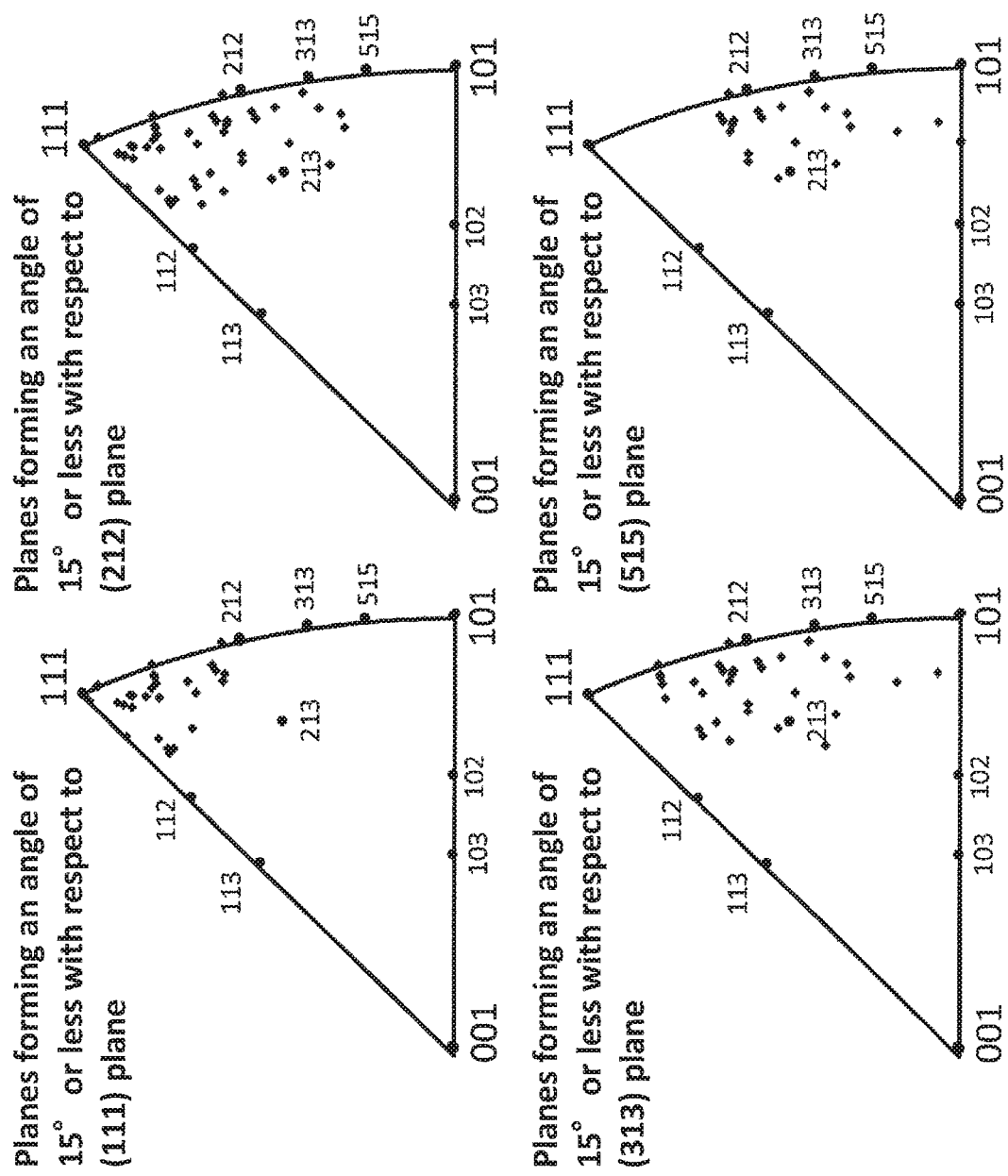
FIG. 25 shows ranges in which the standard deviation of the diameters of the deposits are less than 0.03.
Figure 26:
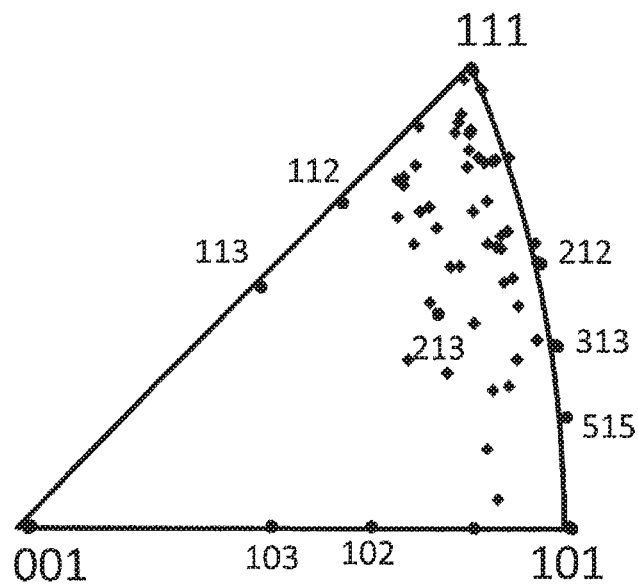
FIG. 26 shows a range in which the standard deviation of the diameters of the deposits are less than 0.03.
Figure 27:
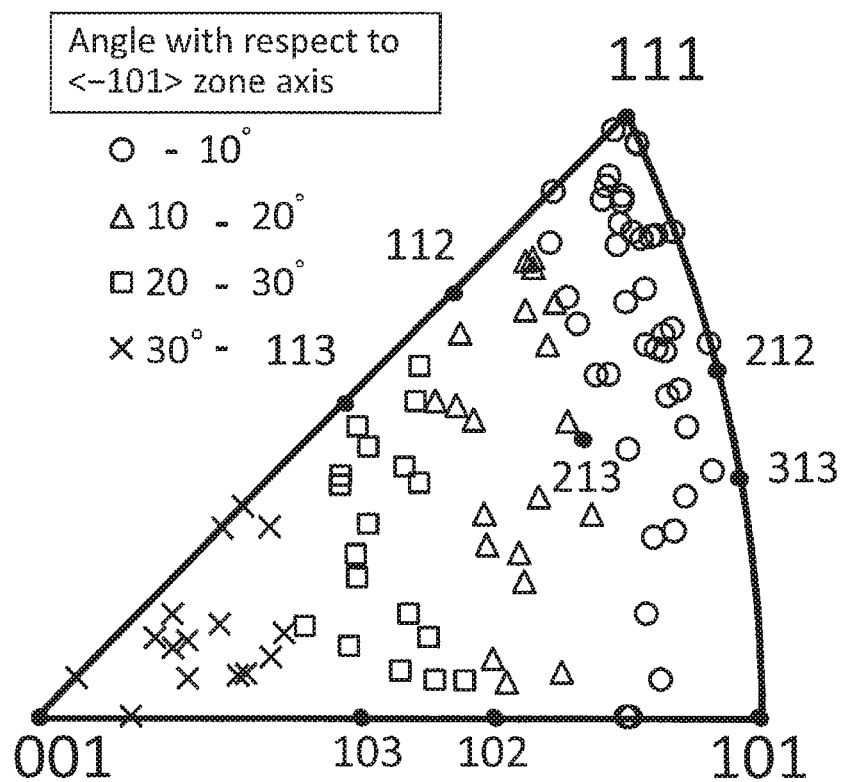
FIG. 27 shows a relation between crystal planes and their angles with respect to the <−101> zone axis.
Figure 28:
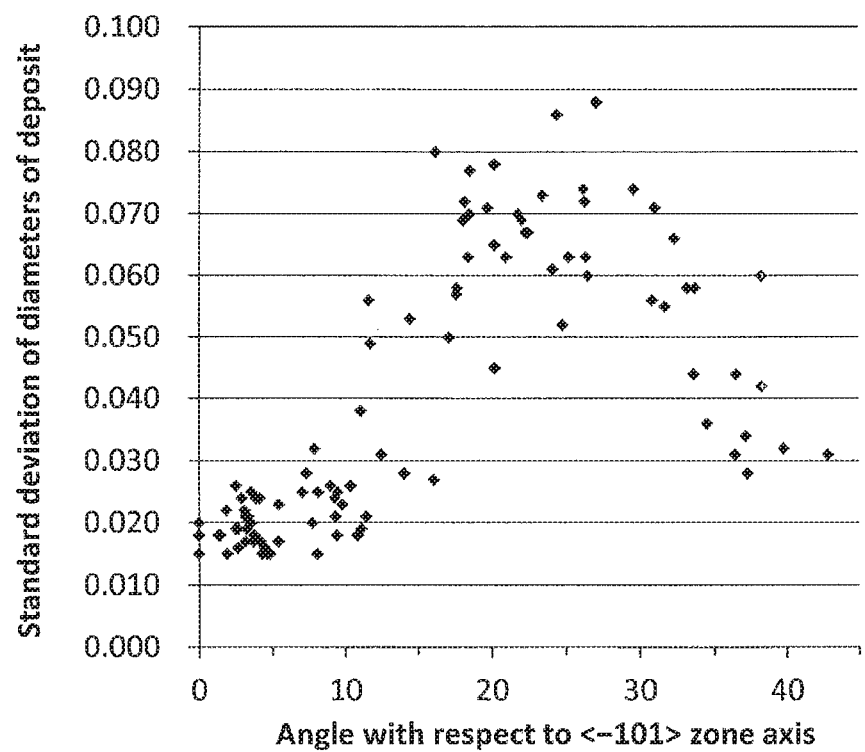
FIG. 28 shows a relation between the standard deviation of the diameters of the deposits and the angle with respect to the <−101> zone axis.

FIG. 19 to FIG. 21 respectively show relations of the standard deviation of the diameters of the deposits with the (111) plane, (101) plane, and (001) plane of the negative electrode current collector. FIG. 22 shows schematic diagrams of the (111) plane, the [−110] zone axis, and [−101] zone axis of the FCC structure (face-centered cubic lattice structure). FIG. 23 shows a relation between a schematic diagram of the [−101] zone and an inverse pole figure. FIG. 24 shows a relation between a schematic diagram of the [−110] zone and an inverse pole figure. FIG. 25 shows ranges in which the standard deviation of the diameters is less than 0.03 on the (111) plane, (212) plane, (313) plane, and (515) plane which are crystal planes belonging to the [−101] zone. FIG. 26 shows a range in which the standard deviation of the diameters is less than 0.03 on the [−101] zone. FIG. 27 shows a relation between the crystal planes and their angles with respect to the <−101> zone axis. FIG. 28 shows a relation between the standard deviation of the diameters of the deposits and angles with respect to the <−101> zone axis. FIG. 19 to FIG. 28 reveal the following facts:

As in the case of the average diameter of the deposits, the standard deviation of the diameters of the deposits is smallest on crystal planes close to the (111) plane.

The standard deviation of the diameters of the deposits is particularly small on crystal planes perpendicular to the (−101) plane which is a side connecting the (111) plane and (101) plane, namely crystal planes belonging to the <−101> zone.

The standard deviation of the diameters of the deposits is particularly large on crystal planes which are high-index planes.

Therefore, the following relation is established between the crystal planes of the negative electrode current collector and the standard deviation of the diameters of the deposits:

$\sigma(111)\text{plane} \approx \sigma(101)\text{plane} < \sigma(001)\text{plane} < \sigma(\text{high-index planes})$ As shown in FIG. 19, each of the values of the standard deviation of the particle diameter of the deposits deposited on crystal planes having an angle of 20° or less with respect to the (111) plane was within the range of 0.01 to 0.05. Moreover, each of the values of the standard deviation of the particle diameters of the deposits deposited on crystal planes having an angle of 15° or less with respect to the (111) plane was within the range of 0.01 to 0.04. Furthermore, each of the values of the standard deviation of the particle diameters of the deposits deposited on crystal planes having an angle of 5° or less with respect to the (111) plane was within the range of 0.01 to 0.03.

(2-3) Discussion

Plane dependence in the previously described relations of the crystal planes of the negative electrode current collector with the average diameter and standard deviation of the diameters of the deposits is attributed to a relation between the crystal planes and equilibrium concentration of adsorbed atoms. The following discusses how the difference in the equilibrium concentration of adsorbed atoms influences the shape of deposits. When metal lithium is caused to be deposited on the negative electrode current collector which is polycrystalline copper, a variation in overvoltage is represented by the following formula (1).

$$\frac{d\eta}{dt} = \frac{i - \frac{1}{s}\sum_{g}^{N} I_g}{C_d + \frac{(ze)^2}{kT} Z_0 \exp\left(\frac{ze\eta}{kT}\right)} \qquad (1)$$

It can be thought that in the formula (1), increase of the equilibrium concentration $Z_0$ of adsorbed atoms influences $d_\eta/dt$ in the same way as decrease of the current i. As it is difficult to analytically solve the formula (1), numerical calculation thereof is attempted using three hypotheses (A) to (C). The three hypotheses (A) to (C) are as follows.

(A) Nucleation occurs after the overvoltage of the negative electrode current collector exceeds a critical overvoltage $\eta_c$. The critical overvoltage $\eta_c$ is an overvoltage at which the first nucleus is formed on a current collector. A nucleation rate J is determined by the following formula (2).

$$J = K_1 \exp\left(-\frac{K_2}{\eta^2}\right) (K_1, K_2: \text{Constants}) \qquad (2)$$

Thus, the critical overvoltage $\eta_c$ is determined by the formula (3).

$$\eta_c = \sqrt{-\frac{K_2}{\ln\left(\frac{1}{sK_1}\right)}} \quad (3)$$

(B) The size of crystal nuclei formed by the nucleation does not depend on the overvoltage of the negative electrode current collector at the time of the nucleation. Changes in the surface area due to growth of the nuclei is not taken into consideration. That is, the size of the crystal nuclei is time-independent and stays constant at a critical radius $r_c$ reached when the overvoltage is the critical overvoltage $\eta_c$. The critical radius $r_c$ is determined by the formula (4).

$$r_c = \frac{2\sigma v}{ze\eta_c} \quad (4)$$

(C) It is assumed that the overvoltage applied to one crystal nucleus is sufficiently small. That is, the Butler-Volmer equation representing a relation between the overvoltage and the current density is approximated as shown in the formula (5).

$$i = i_0\left[\exp\left(\frac{\alpha zF\eta}{RT}\right) - \exp\left(-\frac{(1-\alpha)zF\eta}{RT}\right)\right] \approx \frac{zF}{RT}i_0\eta \quad (5)$$

When the hypotheses (A) to (C) are employed, the current density needed for the growth of the crystal nuclei at time $\tau$ is determined by the formula (6) with the use of the number N(t) of the nuclei at the time.

$$\sum_{N} I_g = (2\pi r_c^2) \times \frac{zei_0}{kT}\eta \times N(t) \quad (6)$$

The number N(t) of the nuclei can be obtained by integrating the nucleation rate J(t). Thus a nucleus growing current is determined by the formula (7).

$$\sum_{N} I_g = (2\pi r_c^2) \times \frac{zei_0}{kT}\eta \times \int_0^t J(\tau)d\tau \quad (7)$$

A time variation of the overvoltage is determined by the formula (8) obtained by substituting the formula (7) into the formula (1).

$$\frac{d\eta}{dt} = \frac{i - \left\{\frac{2\pi r_c^2 \times fi_0\eta(t)}{s}\int_0^t J(\tau)d\tau\right\}}{C_d + zefZ_0\exp\{f\eta(t)\}} \quad (8)$$

The time variation of the overvoltage $\eta$ during constant current charge can be calculated by numerically solving the formula (8) for the overvoltage $\eta$. With the resulting overvoltage $\eta$, a time variation of the nucleation rate J can be determined by the formula (2). FIG. 29 shows the constants used for the calculation.

Figure 30:
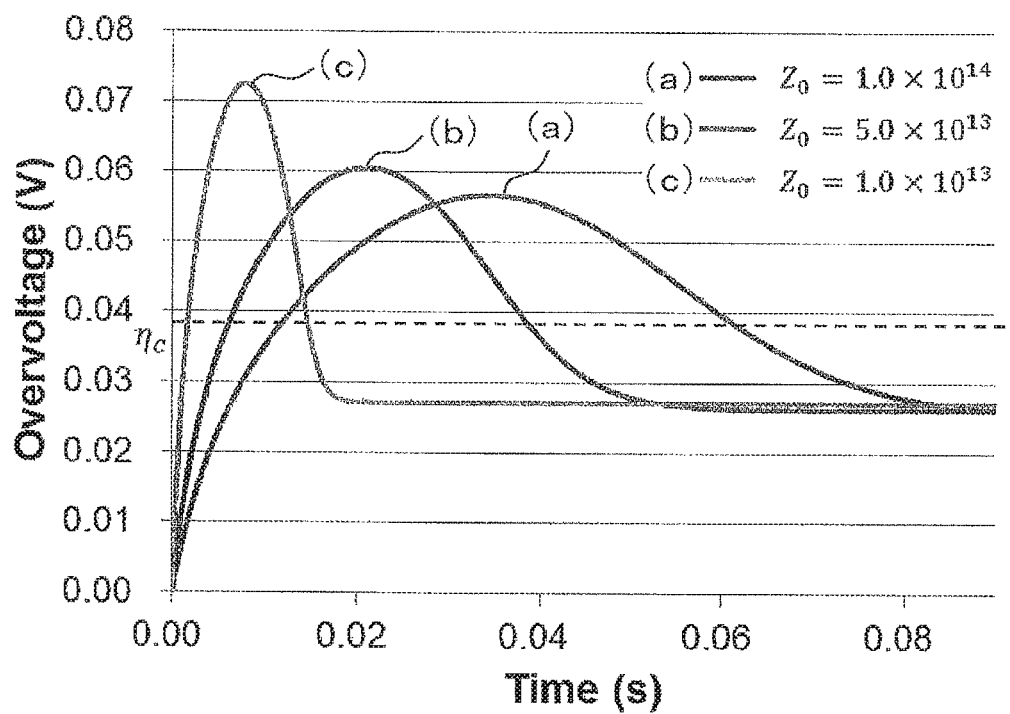
FIG. 30 shows time variations in overvoltage.
Figure 31:
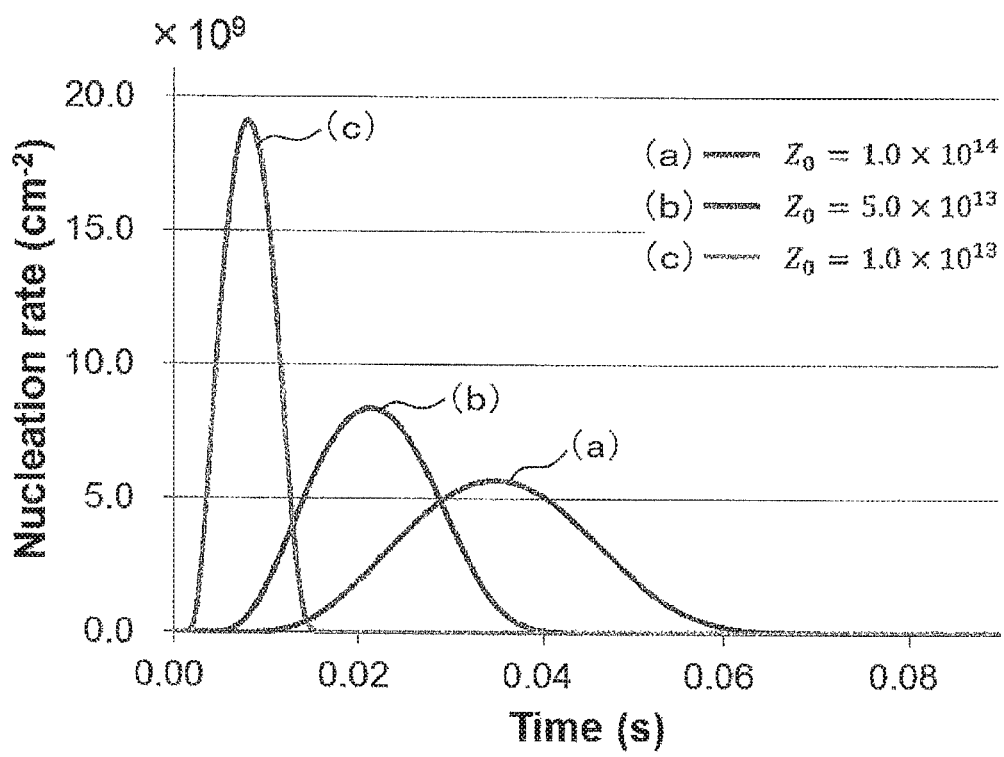
FIG. 31 shows time variations in nucleation rate.

FIG. 30 and FIG. 31 respectively show time variations in overvoltage $\eta$ and those in nucleation rate J determined by the numerical calculation of the formula (8).

As can be seen from FIG. 30, the maximum value of the overvoltage increases as the equilibrium concentration Zo of adsorbed atoms decreases. As can be seen from FIG. 31, the maximum value of the nucleation rate J also increases as the equilibrium concentration Zo of adsorbed atoms decreases. The equilibrium concentration Zo of adsorbed atoms establishes the following relation with the crystal planes of the negative electrode current collector.

Zo(111)plane<Zo(001)plane<Zo(101)plane<Zo(high-index planes)

Additionally, it can be thought that the nucleation on the negative electrode current collector occurs only while the overvoltage is over the critical overvoltage $\eta_c$. Assuming that a period of time in which nucleation is occurring on the negative electrode current collector is $\Delta t$, it can be understood from FIG. 30 that the value decreases as the equilibrium concentration Zo of adsorbed atoms decreases. Comparison of this result with the previously described relation between the crystal planes of the negative electrode current collector and the equilibrium concentration of absorbed atoms leads to the conclusion that the period of time $\Delta t$ in which nucleation is occurring on the negative electrode current collector establishes the following relation with the crystal planes of the negative electrode current collector.

$\Delta t$(111)plane<$\Delta t$(001)plane<$\Delta t$(101)plane<$\Delta t$(high-index planes)

Furthermore, the nucleation rate J establishes the following relation with the crystal planes of the negative electrode current collector.

J(111)plane>J(001)plane>J(101)plane>J(high-index planes)

That is, it can be understood that the higher the nucleation rate J becomes, the shorter the period of time $\Delta t$ in which nucleation is occurring becomes. How the correlation between the nucleation rate J and the period of time $\Delta t$ in which nucleation is occurring changes the diameters and standard deviation of formed nuclei is discussed hereinafter. When the nucleation rate J is relatively high and the period of time $\Delta t$ in which nucleation is occurring is relatively short, nuclei are formed in a relatively short time at a relatively high rate. Thus it can be thought that small crystal nuclei are uniformly formed all over the negative electrode current collector. Accordingly, deposits formed in the early stage of charge are expected to have a relatively small average diameter, relatively small standard deviation of the diameters, and relatively large density. On the other hand, when the nucleation rate is relatively low and the period of time $\Delta t$ in which nucleation is occurring is relatively long, nuclei are formed over a relatively long time at a relatively low rate. Thus it can be thought that a time interval exists from forming a crystal nucleus to forming another one in the vicinity of the former and that the formation and growth of crystal nuclei progress at the same time. Accordingly, deposits formed in the early stage of charge are expected to have a relatively large average diameter, relatively large standard deviation of the diameters, and relatively small density. Therefore, deposits deposited on crystal planes having a relatively small equilibrium concentration Zo of adsorbed atoms have a relatively small average diameter, relatively small standard deviation of the diameters, and relatively large density.

It has been demonstrated above that, the plane dependence in the relations of the crystal planes of the negative electrode current collector with the average diameter and standard deviation of the diameters of the deposits is attributed to the relation between the crystal planes and the equilibrium concentration of adsorbed atoms.

With a focus on those relations of crystal planes with the average diameter and standard deviation of diameters of deposits which are explained by, as described above, the relation between the crystal planes and the equilibrium concentration of adsorbed atoms, the present disclosure uses a crystal plane capable of reducing the average diameter and standard deviation of the diameters of deposits thereon to reduce the phenomenon in which metal lithium is dendritically deposited on the negative electrode current collector in a metal lithium battery. The crystal plane capable of reducing the average diameter and standard deviation of the diameters of deposits thereon is thought to be a close-packed plane, which is the {111} plane in the case of the FCC structure (face-centered cubic lattice structure) as previously described. The close-packed plane refers to a plane in which atoms are packed most closely and is also called a slip plane.

FIG. 32 shows a mode of charge and discharge of a metal lithium battery. Lithium ions are released from the negative electrode by a discharge reaction (oxidation) and revert to metal lithium upon a charge reaction (reduction). When the lithium ions revert to metal lithium upon the charge reaction, the metal lithium is dendritically (arborescently) deposited on the negative electrode current collector which is a base. Though deposition of metal lithium is inevitable, the use of the {111} plane which is the close-packed plane as a crystal plane of the negative electrode current collector of the metal lithium battery can reduce the average diameter and standard deviation of the diameters of deposits for the previously described reason compared to a case where the charge and discharge reactions involving lithium ions are carried out on planes other than the close-packed plane. That is, carrying out the charge and discharge reactions involving lithium ions on the close-packed plane saves the effort of polishing a negative electrode current collector to a predetermined roughness and can even reduce the phenomenon in which metal lithium is dendritically deposited while preventing reduction in electrical conductivity and processability.

The same effect is expected to be achieved for a BCC structure (body-centered cubic lattice structure) and HCP structure (hexagonal close-packed lattice structure) too. In the case of the BCC structure, the use of the {110} plane which is its close-packed plane can reduce the phenomenon in which metal lithium is dendritically deposited. In the case of the HCP structure, the use of the {0001} plane which is its close-packed plane can reduce the phenomenon in which metal lithium is dendritically deposited.

As shown in FIG. 32, the metal lithium battery includes a positive electrode, electrolyte, and negative electrode. The positive electrode and negative electrode face each other across a separator impregnated with the electrolyte. These components are is enclosed in a casing. The positive electrode includes, for example, a positive electrode active material and positive electrode current collector. The positive electrode active material may be any lithium-containing compound capable of absorbing and releasing lithium ions. Examples thereof include $Li_xCoO_2$, $Li_xNiO_2$, and $Li_xMnO_2$. Examples of the positive electrode current collector include stainless steel, aluminum, titanium, carbon, and a conductive resin. The electrolyte contains a non-aqueous solvent and a lithium salt dissolved in the non-aqueous solvent. Examples of the non-aqueous solvent include a cyclic carbonate solvent, chain carbonate solvent, cyclic ether solvent, chain ether solvent, cyclic ester solvent, and chain ester solvent. Examples of the lithium salt include $LiPF_6$, $LiBF_4$, $LiN(SO_2CF_3)_2$, and $LiN(SO_2C_2F_5)_2$. The negative electrode includes a negative electrode current collector and a lithium metal or lithium alloy deposited/dissolved thereon. The negative electrode is free of a negative electrode active material capable of absorbing and releasing lithium ions. In the present disclosure, the term "dissolution" is not limited to complete dissolution but includes partial dissolution. Therefore, for example, some of the lithium metal or lithium alloy may remain on the negative electrode current collector when the metal lithium secondary battery is in a discharged state.

The metal material forming the negative electrode current collector may be other than Cu already mentioned and may be Ni, Fe, Ti, W, Ta, Zn, an alloy of any of them, any type of stainless steels, or graphite.

A processing method including plastic deformation such as drawing, rolling, or pressing is considered to be common in forming a negative electrode current collector using a metal material, and thus the basic form of the negative electrode current collector can be, for example, a wire, plate, or foil. The proportion of crystal planes with certain orientations in the surface where metal lithium is deposited can be changed by the above processing to control the phenomenon in which metal lithium is dendritically deposited. The proportion of crystal planes with certain orientations can be changed by controlling a texture to control the distribution of crystal planes of crystal grains existing in the polycrystalline material.

Examples of a material having the BCC structure include Ni, Fe, W, Ta, and stainless steel. Examples of a material having the HCP structure include Ti, Zn, and graphite. The negative electrode current collector may be formed of an alloy. For example, if the negative electrode current collector is a eutectic, "the crystal structure of the negative electrode current collector" refers to the crystal structure of a metal accounting for the highest proportion among metals composing the eutectic.

As previously described in (1-2), crystal planes in different regions on the surface of the negative electrode current collector can be analyzed by a combination of SEM and EBSD.

For example, when the crystal structure of the negative electrode current collector is the FCC structure or BCC structure, the dominant crystal plane can be determined by mapping crystal grains on the surface of the negative electrode current collector based on the following three groups.

Crystal grains whose crystal plane is a just plane of the (001) plane or off plane (off-angle≤20°) of the (001) plane Crystal grains whose crystal plane is a just plane of the (101) plane or off plane (off-angle≤20°) of the (101) plane Crystal grains whose crystal plane is a just plane of the (111) plane or off plane (off-angle≤20°) of the (111) plane For example, when the crystal structure of the negative electrode current collector is the HCP structure, the dominant crystal plane can be determined by mapping crystal grains on the surface of the negative electrode current collector based on the following four groups.

Crystal grains whose crystal plane is a just plane of the (0001) plane or off plane (off-angle≤20°) of the (0001) plane Crystal grains whose crystal plane is a just plane of the (10-10) plane or off plane (off-angle≤20°) of the (10-10) plane Crystal grains whose crystal plane is a just plane of the (10-11) plane or off plane (off-angle≤20°) of the (10-11) plane Crystal grains whose crystal plane is a just plane of the (11-20) plane or off plane (off-angle≤20°) of the (11-20) plane When the crystal structure of the negative electrode current collector is the FCC structure or BCC structure, a crystal plane of the negative electrode current collector is represented by three integers, namely, three Miller indices. When the crystal structure of the negative electrode current collector is the HCP structure, a crystal plane of the negative electrode current collector is represented by four integers, or four Miller indices. In the present disclosure, "three of Miller indices" refers to all three Miller indices in the case of the FCC structure or BCC structure, while it refers to three of the four Miller indices in the case of the HCP structure.

"Metal lithium" does not exclusively refer to pure lithium consisting only of lithium (a pure metal consisting of a single metal element). The same behavior as with pure lithium can be induced with a lithium-containing lithium alloy. For example, with a lithium alloy of Si, Al, Sn, Zn, Au, or Ag, the phenomenon in which metal lithium is dendritically deposited can be reduced in the same manner.

What is claimed is:

1. A lithium secondary battery comprising:
a positive electrode;
an electrolyte comprising lithium ions; and
a negative electrode current collector having a surface on which a lithium metal or a lithium alloy is deposited/dissolved, wherein
the negative electrode current collector has a crystal structure,
in the surface of the negative electrode current collector, a group comprising at least one region whose principal crystal plane is a close-packed plane of the crystal structure or an off plane having an off-angle of 20° or less with respect to the close-packed plane occupies the largest area among three or four groups each comprising at least one region having a principal crystal plane three of whose Miller indices are each represented by 0 or 1 or an off-plane having an off-angle of 20° or less with respect to the principal crystal plane, the principal crystal plane being different for each of the three or four groups,
a material of the negative electrode current collector contains at least one selected from the group consisting of Cu, Ni, Fe, Ti, W, Ta, and Zn, stainless steel, or graphite, and
the crystal structure is a face-centered cubic lattice structure,
the close-packed plane is a {111} plane, and
the principal crystal planes other than the close-packed plane are each a {001} plane or a {101} plane.

2. The lithium secondary battery according to claim 1, further comprising the lithium metal or the lithium alloy deposited on the negative electrode current collector.

3. The lithium secondary battery according to claim 1, wherein
the lithium metal or the lithium alloy is composed of a plurality of particles of hemispherical shape when the lithium secondary battery is in a charged state, and
a standard deviation of diameters of the plurality of particles is 0.01 or more and 0.05 or less.

4. The lithium secondary battery according to claim 1, wherein the off-angle is 15° or less with respect to the principal crystal plane.

5. The lithium secondary battery according to claim 4, wherein
the lithium metal or the lithium alloy is composed of a plurality of particles of hemispherical shape when the lithium secondary battery is in a charged state, and
an average diameter of the plurality of particles is 120 nm or more and 200 nm or less.

6. The lithium secondary battery according to claim 4, wherein
the lithium metal or the lithium alloy is composed of a plurality of particles of hemispherical shape when the lithium secondary battery is in a charged state, and
a standard deviation of diameters of the plurality of particles is 0.01 or more and 0.04 or less.

7. The lithium secondary battery according to claim 1, wherein
the off-angle is less than 5° with respect to the principal crystal plane.

8. The lithium secondary battery according to claim 7, wherein
the lithium metal or the lithium alloy is composed of a plurality of particles of hemispherical shape when the lithium secondary battery is in a charged state, and
an average diameter of the plurality of particles is 120 nm or more and 160 nm or less.

9. The lithium secondary battery according to claim 7, wherein
the lithium metal or the lithium alloy is composed of a plurality of particles of hemispherical shape when the lithium secondary battery is in a charged state, and
a standard deviation of diameters of the plurality of particles is 0.01 or more and 0.03 or less.

10. A lithium secondary battery comprising:
a positive electrode;
an electrolyte comprising lithium ions; and
a negative electrode current collector having a surface on which a lithium metal or a lithium alloy is deposited/dissolved, wherein
the negative electrode current collector has a crystal structure,
in the surface of the negative electrode current collector, a group comprising at least one region whose principal crystal plane is a close-packed plane of the crystal structure or an off plane having an off-angle of 20° or less with respect to the close-packed plane occupies the largest area among three or four groups each comprising at least one region having a principal crystal plane three of whose Miller indices are each represented by 0 or 1 or an off-plane having an off-angle of 20° or less with respect to the principal crystal plane, the principal crystal plane being different for each of the three or four groups,
a material of the negative electrode current collector contains at least one selected from the group consisting of Cu, Ni, Fe, Ti, W, Ta, and Zn, stainless steel, or graphite,
the crystal structure is a body-centered cubic lattice structure,
the close-packed plane is a {110} plane, and
the principal crystal planes other than the close-packed plane are each a {001} plane or a {111} plane.

11. A lithium secondary battery comprising:
a positive electrode;
an electrolyte comprising lithium ions; and
a negative electrode current collector having a surface on which a lithium metal or a lithium alloy is deposited/dissolved, wherein
the negative electrode current collector has a crystal structure,
in the surface of the negative electrode current collector, a group comprising at least one region whose principal crystal plane is a close-packed plane of the crystal structure or an off plane having an off-angle of 20° or less with respect to the close-packed plane occupies the largest area among three or four groups each comprising at least one region having a principal crystal plane three of whose Miller indices are each represented by 0 or 1 or an off-plane having an off-angle of 20° or less with respect to the principal crystal plane, the principal crystal plane being different for each of the three or four groups,
a material of the negative electrode current collector contains at least one selected from the group consisting of Cu, Ni, Fe, Ti, W, Ta, and Zn, stainless steel, or graphite,
the crystal structure is a hexagonal close-packed structure,
the close-packed plane is a {0001} plane, and
the principal crystal planes other than the close-packed plane are each a {10-10} plane, a {10-11} plane, or a {11-20} plane.

12. The lithium secondary battery according to claim 1, wherein
the negative electrode current collector is a polycrystal, and
each of the plurality of regions corresponds to one crystal grain.

13. The lithium secondary battery according to claim 10, further comprising the lithium metal or the lithium alloy deposited on the negative electrode current collector.

14. The lithium secondary battery according to claim 10, wherein
the lithium metal or the lithium alloy is composed of a plurality of particles of hemispherical shape when the lithium secondary battery is in a charged state, and
a standard deviation of diameters of the plurality of particles is 0.01 or more and 0.05 or less.

15. The lithium secondary battery according to claim 10, wherein the off-angle is 15° or less with respect to the principal crystal plane.

16. The lithium secondary battery according to claim 15, wherein
the lithium metal or the lithium alloy is composed of a plurality of particles of hemispherical shape when the lithium secondary battery is in a charged state, and
an average diameter of the plurality of particles is 120 nm or more and 200 nm or less.

17. The lithium secondary battery according to claim 15, wherein
the lithium metal or the lithium alloy is composed of a plurality of particles of hemispherical shape when the lithium secondary battery is in a charged state, and
a standard deviation of diameters of the plurality of particles is 0.01 or more and 0.04 or less.

18. The lithium secondary battery according to claim 10, wherein
the off-angle is less than 5° with respect to the principal crystal plane.

19. The lithium secondary battery according to claim 18, wherein
the lithium metal or the lithium alloy is composed of a plurality of particles of hemispherical shape when the lithium secondary battery is in a charged state, and
an average diameter of the plurality of particles is 120 nm or more and 160 nm or less.

20. The lithium secondary battery according to claim 18, wherein
the lithium metal or the lithium alloy is composed of a plurality of particles of hemispherical shape when the lithium secondary battery is in a charged state, and
a standard deviation of diameters of the plurality of particles is 0.01 or more and 0.03 or less.

21. The lithium secondary battery according to claim 10, wherein
the negative electrode current collector is a polycrystal, and
each of the plurality of regions corresponds to one crystal grain.

22. The lithium secondary battery according to claim 11, further comprising the lithium metal or the lithium alloy deposited on the negative electrode current collector.

23. The lithium secondary battery according to claim 11, wherein
the lithium metal or the lithium alloy is composed of a plurality of particles of hemispherical shape when the lithium secondary battery is in a charged state, and
a standard deviation of diameters of the plurality of particles is 0.01 or more and 0.05 or less.

24. The lithium secondary battery according to claim 11, wherein the off-angle is 15° or less with respect to the principal crystal plane.

25. The lithium secondary battery according to claim 24, wherein
the lithium metal or the lithium alloy is composed of a plurality of particles of hemispherical shape when the lithium secondary battery is in a charged state, and
an average diameter of the plurality of particles is 120 nm or more and 200 nm or less.

26. The lithium secondary battery according to claim 24, wherein
the lithium metal or the lithium alloy is composed of a plurality of particles of hemispherical shape when the lithium secondary battery is in a charged state, and
a standard deviation of diameters of the plurality of particles is 0.01 or more and 0.04 or less.

27. The lithium secondary battery according to claim 11, wherein the off-angle is less than 5° with respect to the principal crystal plane.

28. The lithium secondary battery according to claim 27, wherein
the lithium metal or the lithium alloy is composed of a plurality of particles of hemispherical shape when the lithium secondary battery is in a charged state, and
an average diameter of the plurality of particles is 120 nm or more and 160 nm or less.

29. The lithium secondary battery according to claim 27, wherein
the lithium metal or the lithium alloy is composed of a plurality of particles of hemispherical shape when the lithium secondary battery is in a charged state, and
a standard deviation of diameters of the plurality of particles is 0.01 or more and 0.03 or less.

30. The lithium secondary battery according to claim 11, wherein
the negative electrode current collector is a polycrystal, and
each of the plurality of regions corresponds to one crystal grain.

* * * * *